US008056033B2

(12) United States Patent
Nakashima

(10) Patent No.: US 8,056,033 B2
(45) Date of Patent: Nov. 8, 2011

(54) APPARATUS AND METHOD FOR INTEGRATED CIRCUIT DESIGN WITH IMPROVED DELAY VARIATION CALCULATION BASED ON POWER SUPPLY VARIATIONS

(75) Inventor: Hidenari Nakashima, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 715 days.

(21) Appl. No.: 12/213,557

(22) Filed: Jun. 20, 2008

(65) Prior Publication Data

US 2008/0320427 A1  Dec. 25, 2008

(30) Foreign Application Priority Data

Jun. 21, 2007  (JP) ................. 2007-163332

(51) Int. Cl.
G06F 17/50   (2006.01)
G06F 9/455   (2006.01)

(52) U.S. Cl. .................. 716/108; 716/100; 716/113

(58) Field of Classification Search .................. 716/100, 716/108, 113
See application file for complete search history.

(56) References Cited

U.S. PATENT DOCUMENTS

| | | | | |
|---|---|---|---|---|
| 6,604,066 | B1 * | 8/2003 | Hatsuda ........................... | 703/19 |
| 7,225,418 | B2 * | 5/2007 | Shimazaki et al. ............. | 716/113 |
| 7,299,438 | B2 * | 11/2007 | Hosono ........................... | 716/113 |
| 7,882,471 | B1 * | 2/2011 | Kariat et al. ................... | 716/113 |
| 2006/0225014 | A1 * | 10/2006 | Hosono ............................. | 716/6 |
| 2007/0226660 | A1 * | 9/2007 | Ogawa .............................. | 716/2 |
| 2008/0250370 | A1 * | 10/2008 | Abbaspour et al. .............. | 716/6 |
| 2009/0013294 | A1 * | 1/2009 | Visweswariah ................... | 716/6 |
| 2009/0153172 | A1 * | 6/2009 | Anand et al. ................... | 324/763 |
| 2010/0083198 | A1 * | 4/2010 | Zhang et al. ..................... | 716/4 |

FOREIGN PATENT DOCUMENTS

| | | |
|---|---|---|
| JP | 2000-99554 | 4/2000 |
| JP | 2005-4268 | 1/2005 |

OTHER PUBLICATIONS

Lin, Shen, et al., "Full-Chip Vectorless Dynamic Power Integrity Analysis and Verification Against 100uV/100ps-Resolution Measurement", Proceedings of Custom Integrated Circuits Conference 2004, Oct. 2004, pp. 509-512.

* cited by examiner

*Primary Examiner* — Thuan Do
*Assistant Examiner* — Magid Dimyan
(74) *Attorney, Agent, or Firm* — McGinn IP Law Group, PLLC

(57) ABSTRACT

An integrated circuit design apparatus is provided with a power supply voltage variation analysis tool calculating variations of power supply voltages of respective instances integrated within a target circuit; a determination module comparing the variations of the power supply voltages with first and second reference levels, the second reference level being smaller than the first reference level; a redesign module adapted to redesign the target circuit when at least one of the variations of the power supply voltages is larger than the first reference level; a delay variation calculation module adapted to correct circuit delay data of the respective instances based on the variations of the power supply voltages of the respective instances; a static timing analysis tool performing timing verification of the target integrated circuit. The timing verification in connection with each of the instances is performed based on the corrected circuit delay data, when a variation of a power supply voltage of the each of the instances is in a range from the second reference level to the first reference level, and performed based on the circuit delay data uncorrected, when the variation of the power supply voltage of the each of the instances is smaller than the second reference level.

19 Claims, 25 Drawing Sheets

Fig. 11

| CIRCUIT OPERATION PATTERN #1 | | CIRCUIT OPERATION PATTERN #2 | | CIRCUIT OPERATION PATTERN #3 | |
|---|---|---|---|---|---|
| | STATE | | STATE | | STATE |
| INSTANCE #1 | High→Low | INSTANCE #5 | Low→High | INSTANCE #9 | High→Low |
| INSTANCE #2 | Low→High | INSTANCE #6 | Low→High | INSTANCE #10 | High→Low |
| INSTANCE #3 | Low→High | INSTANCE #7 | High→Low | INSTANCE #11 | Low→High |
| INSTANCE #4 | High→Low | INSTANCE #8 | High→Low | INSTANCE #12 | Low→High |

| | 1ST CYCLE | 2ND CYCLE | 3RD CYCLE |
|---|---|---|---|
| INSTANCE #1 | High→Low | NOP | NOP |
| INSTANCE #2 | Low→High | NOP | NOP |
| INSTANCE #3 | Low→High | NOP | NOP |
| INSTANCE #4 | High→Low | NOP | NOP |
| INSTANCE #5 | NOP | Low→High | NOP |
| INSTANCE #6 | NOP | Low→High | NOP |
| INSTANCE #7 | NOP | High→Low | NOP |
| INSTANCE #8 | NOP | High→Low | NOP |
| INSTANCE #9 | NOP | NOP | High→Low |
| INSTANCE #10 | NOP | NOP | High→Low |
| INSTANCE #11 | NOP | NOP | Low→High |
| INSTANCE #12 | NOP | NOP | Low→High |

NOP: NON OPERATION

CIRCUIT OPERATION PATTERN #1

| | 1ST CYCLE | 2ND CYCLE | 3RD CYCLE |
|---|---|---|---|
| INSTANCE #1 | High→Low | NOP | NOP |
| INSTANCE #2 | Low→High | NOP | NOP |
| INSTANCE #3 | Low→High | NOP | NOP |
| INSTANCE #4 | High→Low | NOP | NOP |
| INSTANCE #5 | NOP | Low→High | NOP |
| INSTANCE #6 | NOP | Low→High | NOP |
| INSTANCE #7 | NOP | High→Low | NOP |
| INSTANCE #8 | NOP | High→Low | NOP |
| INSTANCE #9 | NOP | NOP | High→Low |
| INSTANCE #10 | NOP | NOP | High→Low |
| INSTANCE #11 | NOP | NOP | Low→High |
| INSTANCE #12 | NOP | NOP | Low→High |

CIRCUIT OPERATION PATTERN #2

| | 1ST CYCLE | 2ND CYCLE | 3RD CYCLE |
|---|---|---|---|
| INSTANCE #1 | High→Low | NOP | NOP |
| INSTANCE #2 | Low→High | NOP | NOP |
| INSTANCE #3 | Low→High | NOP | NOP |
| INSTANCE #4 | High→Low | NOP | NOP |
| INSTANCE #5 | NOP | Low→High | NOP |
| INSTANCE #6 | NOP | Low→High | NOP |
| INSTANCE #7 | NOP | High→Low | NOP |
| INSTANCE #8 | NOP | High→Low | NOP |
| INSTANCE #9 | NOP | NOP | High→Low |
| INSTANCE #10 | NOP | NOP | High→Low |
| INSTANCE #11 | NOP | NOP | Low→High |
| INSTANCE #12 | NOP | NOP | Low→High |

CIRCUIT OPERATION PATTERN #3

| | 1ST CYCLE | 2ND CYCLE | 3RD CYCLE |
|---|---|---|---|
| INSTANCE #1 | High→Low | NOP | NOP |
| INSTANCE #2 | Low→High | NOP | NOP |
| INSTANCE #3 | Low→High | NOP | NOP |
| INSTANCE #4 | High→Low | NOP | NOP |
| INSTANCE #5 | NOP | Low→High | NOP |
| INSTANCE #6 | NOP | Low→High | NOP |
| INSTANCE #7 | NOP | High→Low | NOP |
| INSTANCE #8 | NOP | High→Low | NOP |
| INSTANCE #9 | NOP | NOP | High→Low |
| INSTANCE #10 | NOP | NOP | High→Low |
| INSTANCE #11 | NOP | NOP | Low→High |
| INSTANCE #12 | NOP | NOP | Low→High |

| | 1ST CYCLE | 2ND CYCLE | 3RD CYCLE | 4TH CYCLE | 5TH CYCLE | 6TH CYCLE | 7TH CYCLE | 8TH CYCLE | 9TH CYCLE |
|---|---|---|---|---|---|---|---|---|---|
| INSTANCE #1 | High→Low | NOP | NOP | High→Low | NOP | NOP | High→Low | NOP | NOP |
| INSTANCE #2 | Low→High | NOP | NOP | Low→High | NOP | NOP | Low→High | NOP | NOP |
| INSTANCE #3 | Low→High | NOP | NOP | Low→High | NOP | NOP | Low→High | NOP | NOP |
| INSTANCE #4 | High→Low | NOP | NOP | High→Low | NOP | NOP | High→Low | NOP | NOP |
| INSTANCE #5 | NOP | Low→High | NOP | NOP | Low→High | NOP | NOP | Low→High | NOP |
| INSTANCE #6 | NOP | Low→High | NOP | NOP | Low→High | NOP | NOP | Low→High | NOP |
| INSTANCE #7 | NOP | High→Low | NOP | NOP | High→Low | NOP | NOP | High→Low | NOP |
| INSTANCE #8 | NOP | High→Low | NOP | NOP | High→Low | NOP | NOP | High→Low | NOP |
| INSTANCE #9 | NOP | NOP | High→Low | NOP | NOP | High→Low | NOP | NOP | High→Low |
| INSTANCE #10 | NOP | NOP | High→Low | NOP | NOP | High→Low | NOP | NOP | High→Low |
| INSTANCE #11 | NOP | NOP | Low→High | NOP | NOP | Low→High | NOP | NOP | Low→High |
| INSTANCE #12 | NOP | NOP | Low→High | NOP | NOP | Low→High | NOP | NOP | Low→High |

NOP : NON OPERATION

Fig. 12

| | PIN A | PIN B | PIN C | VOLTAGE VARIATION ΔVDD−ΔGND[V] | DELAY VARIATION DELAY[sec] | DELAY VARIATION FACTOR DF=(delay)/(ΔVDD−ΔGND) [SEC/V] | |
|---|---|---|---|---|---|---|---|
| 1 | High→High | High→High | High→Low | V11 | delay 11 | DF11 | DF1 |
| | | | | V12 | delay 12 | DF12 | |
| 2 | High→Low | High→Low | High→High | V21 | delay 21 | DF21 | DF2 |
| | | | | V22 | delay 22 | DF22 | |
| 3 | High→Low | High→Low | High→High | V31 | delay 31 | DF31 | DF3 |
| | | | | V32 | delay 32 | DF32 | |
| ... | ... | ... | ... | ... | ... | ... | ... |

APPARATUS AND METHOD FOR INTEGRATED CIRCUIT DESIGN WITH IMPROVED DELAY VARIATION CALCULATION BASED ON POWER SUPPLY VARIATIONS

INCORPORATION BY REFERENCE

This application claims the benefit of priority based on Japanese Patent Application No. 2007-163332, filed on Jun. 21, 2007, the disclosure of which is incorporated herein by reference.

BACKGROUND OF THE INVENTION

1. Field of the Invention

The present invention relates to an apparatus, method and computer program product for design verification of semiconductor integrated circuits. More specifically, the present invention relates to power supply variation analysis and delay variation calculation based on power supply variations.

2. Description of the Related Art

In recent years, there are remarkable technology progresses in power supply voltage reduction and operation speed enhancement of semiconductor integrated circuits. On the other hand, the power supply voltage reduction and operation speed enhancement, as well as the increase in the interconnection resistance due to the reduction in dimensions of layout patterns, lead to the situation in which the variations in the power supply voltage are not negligible for ensuring the stable operations of the semiconductor integrated circuit.

Recently, attention is paid to power supply variation analysis for power supply noise, that is, variations in the power supply voltage and the ground voltage caused by semiconductor integrated circuit operations. For example, Lin et al. discloses a vectorless dynamic power-ground noise analysis approach in a non-patent document entitled: S Lin, M. Nagata, K. Shimazaki, K. Satoh, M. Sumita, H. Tsujikawa, A. T. Yang, "Full-chip Vectorless Dynamic Power Integrity Analysis and Verification Against 100 uV/100 ps-Resolution Measurement", Proceedings of Custom Integrated Circuits Conference 2004, October 2004, Pp. 509-512. In the power supply variation analysis, variations in the power supply voltage and the ground voltage are calculated for desired one(s) of instances integrated within in the semiconductor integrated circuit.

In FIG. 5, typical models of power supply variation analysis are shown. In FIG. 5, instances A and B are instances incorporated within an integrated circuit for which the power supply variation analysis is to be performed. The output signals of the respective instances vary in response to signal level changes of the respective input signals. The signal level changes in the output signals cause generation of power supply currents through the power and ground lines, and the power supply currents cause variations in the voltage levels of the power and ground lines due to the resistances thereof. When the resistances of the power and ground lines of the instance B are larger than those of the instance A, the instance B experiences larger power supply variations. The magnitude of the power supply variations depends not only on the resistance of the power and ground lines but also by the buffer's drive capability, the output load capacitance, the slew rate of the input signal, the capacitance between the power and ground lines, and so on. The power supply variation analysis needs to be performed in light of these various factors.

One issue is that the analysis time necessary for power supply variation analysis undesirably increases as the increase in the integrated circuit scale, when the variations in the power supply voltage are analyzed for all instances integrated within the integrated circuit.

Also, one proposed approach for the reduction of the power supply variations is to integrate decoupling capacitors (or capacitor cells) within the integrated circuit. However, this approach suffers from the increase in the calculation time for determining the positions and capacitances of the decoupling capacitors.

Japanese Laid-Open Patent Application No. 2005-4268 (referred to as the '268 application, hereinafter) discloses a conventional method and apparatus for power supply variation analysis. A description is given of the disclosed method and apparatus in the following, referring to FIGS. 24 and 25.

FIG. 24 is a flowchart showing the power supply variation analysis method disclosed in the '268 application. The disclosed method is directed to calculation time reduction of the power supply variation analysis by dividing the voltage calculation range, which is defined as the time period between the switching of the input signal Vin and the switching of the output signal Vout, into multiple time segments, by averaging or characterizing the voltage waveforms in the respective time segments.

A description is given next of the configuration of the power supply variation analysis apparatus disclosed in the '268 application, referring to FIG. 25. FIG. 25 is a block diagram of the conventional power supply variation analysis apparatus. Layout data of the target LSI (large scale integrated circuit) are generated by the placement and routing section 101 and circuit connection data extracted from the layout data are fed to a power supply variation analysis section 102. The power supply variation analysis section 102 analyzes the power supply variations to generate power supply variation report data 103 indicative of the power supply variations. The power supply variation report data 103 is fed to a delay calculation section 104. The delay calculation section 104 performs delay calculation and outputs SDF (standard delay format) data which are circuit delay data associated with circuit blocks for which STA (static timing analysis) is to be performed later. The SDF data are inputted to an STA (static timing analysis) section 105, and the STA section 105 generates timing report data 106. The timing report data 106 is fed to an optimization section 107, and the optimization section 107 performs circuit optimization.

Furthermore, Japanese Laid-Open Patent Application No. 2000-99554 (referred to as the '554 application, hereinafter) discloses an example of a delay library used for the power supply variation analysis. In detail, the '554 application discloses that buffer delay times are expressed in the delay library with three parameters: the slew rate of the input signal, the output load capacitance, and the power supply voltage.

The '554 application also discloses a integrated design technique which involves obtaining operating voltage distributions of the respective logic blocks depending on the positions of the power supply lines, performing initial schematic placement of the logic blocks, calculating the delay times of the respective logic blocks using the delay library, performing schematic placement of the logic blocks again so as to reduce the calculated delay time for the improvement of the operation timings of the logic blocks, and then performing detailed placement of the logic blocks.

In the conventional techniques (such as the technique disclosed in the '268 application), delay calculation is followed by timing analysis based on the delay calculation result. This is followed by cell arrangement optimization based on the timing analysis result, such as insertion of capacitor cells or movement of instances, when any timing error is discovered by the timing analysis. This undesirably necessitates performing the power supply variation analysis and timing analysis again after the cell arrangement optimization to determine whether the problem is solved by the cell arrangement optimization. This approach undesirably requires a longer time for converging the calculation result.

Furthermore, an operation of a certain circuit may cause a malfunction of another circuit when the integrated circuit suffers from large power supply voltage variations; however, such malfunction is often overlooked by ordinary static timing verification. The above-described conventional techniques give no considerations to this problem.

SUMMARY

According to the study of the inventor and his associates, it is substantially unnecessary to consider the influence of the power supply variation on the delay time variation, when the influence of the power supply variations on the delay variations is smaller than the influence of other factors (such as manufacture variations) on the delay variations, because the influence of the power supply variations on the delay variations is negligible when the power supply variations are sufficiently reduced.

In such a case, delay calculation is desirably performed without using the results of the power supply variation analysis; the use of the results of the power supply variation analysis undesirably increases the calculation time necessary for the delay calculation.

In an aspect of the present invention, an integrated circuit design apparatus is provided with a power supply voltage variation analysis tool calculating variations of power supply voltages of respective instances integrated within a target circuit; a determination module comparing said variations of said power supply voltages with first and second reference levels, said second reference level being smaller than said first reference level; a redesign module adapted to redesign said target circuit when at least one of said variations of said power supply voltages is larger than said first reference level; a delay variation calculation module adapted to correct circuit delay data of said respective instances based on said variations of said power supply voltages of said respective instances; and a static timing analysis tool performing timing verification of said target integrated circuit. In said timing verification, said corrected circuit delay data are used for a specific instance out of said instances within said target circuit, when a variation of a power supply voltage of said specific instance is in a range from said second reference level to said first reference level, and said circuit delay data uncorrected are used for said specific instance, when said variation of said power supply voltage of said specific instance is smaller than said second reference level.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 11 is a schematic diagram showing an exemplary procedure of generation of circuit operation pattern data in the first embodiment;

FIG. 12 is a schematic diagram showing another exemplary procedure of generation of circuit operation pattern data in the first embodiment;

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

First Embodiment

Figure 1:
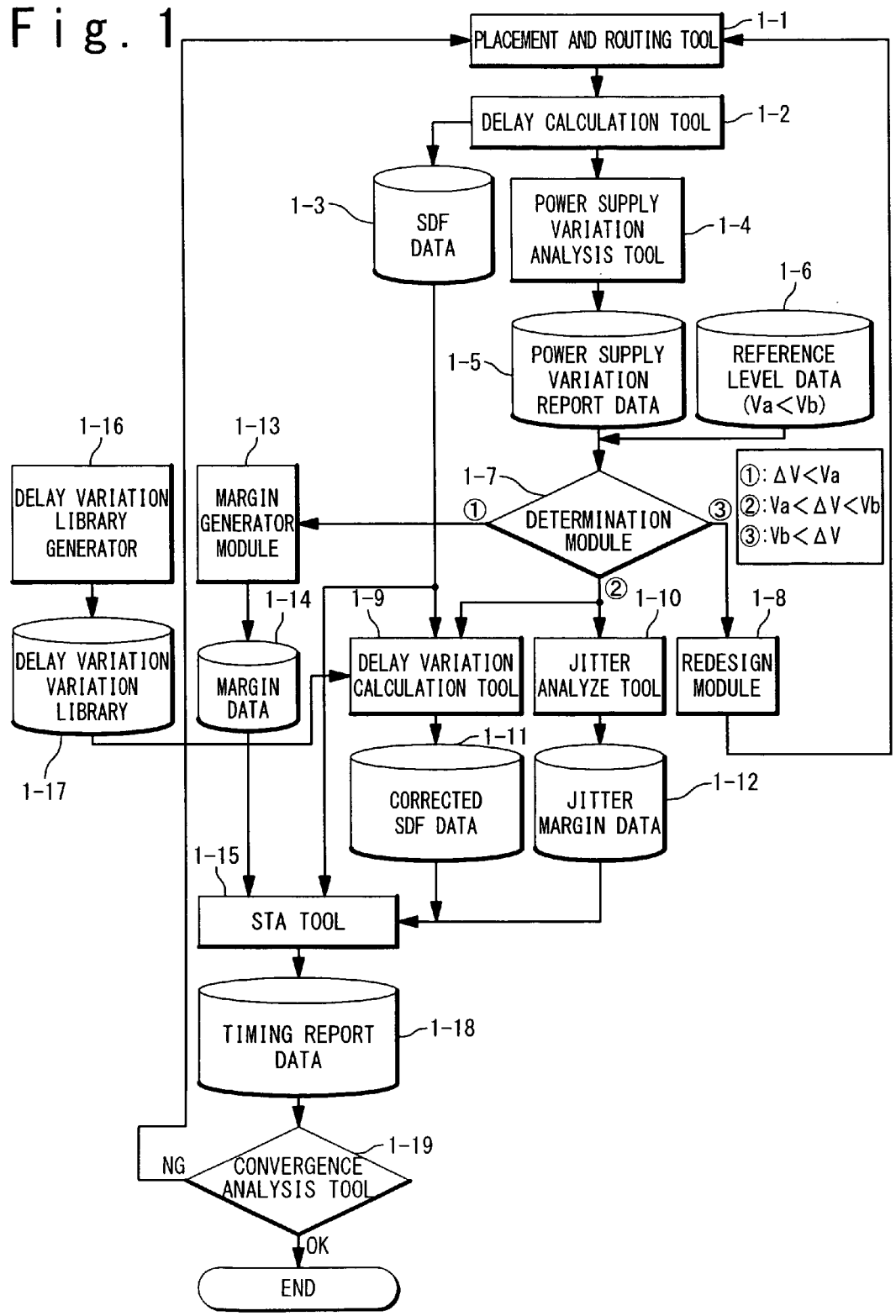
FIG. 1 is a block diagram showing an overall configuration of an integrated circuit design apparatus according to a first embodiment of the present invention.

FIG. 1 is a schematic diagram explaining an overall configuration of an integrated circuit design apparatus of a first embodiment of the present invention.

The integrated circuit design apparatus shown in FIG. 1 is provided with the placement and routing tool 1-1, a delay calculation tool 1-2, the power supply variation analysis tool 1-4, a determination module 1-7, a margin data generator module 1-13, a delay variation calculation tool 1-9, a jitter analyze tool 1-10, a redesign module 1-8, a delay variation library generator 1-16, a STA (static timing analysis) tool 1-15, and a convergence analysis tool 1-19.

The placement and routing tool 1-1 performs placement and routing for a target circuit, and thereby generates layout data indicative of the layout of the target circuit. The delay calculation tool 1-2 performs delay calculation on the basis of the layout data, and thereby generates SDF (standard delay format) data 1-3 which include circuit delay data indicative of delay times of respective interconnections and instances within the target circuit.

The power supply variation analysis tool 1-4 performs power supply variation analysis based on the layout data generated by the placement and routing tool 1-1 and thereby generates power supply variation report data 1-5 indicative of the variations in the power supply voltages of the respective instances within the target circuit. The determination module 1-7 determines the magnitudes of the power supply variations on the basis of the power supply variation report data 1-5 by comparing the variations in the power supply voltages of the respective instances described in the power supply variation report data 1-5 with reference levels Va and Vb described in reference level data 1-6. It should be noted that the reference level Va is smaller than the reference level Vb.

The redesign module 1-8 is used to implement redesign of the target circuit, such as optimization of decoupling capacitors, insertion of additional decoupling capacitors, repositioning of the instances.

The delay variation calculation tool 1-9 is used to calculate delay variations of the respective instances caused by the dynamic noise (that is, the power supply variations), and to provide correction of circuit delay data described within the SDF data 1-3 in accordance with the calculated delay variations of the respective instances. The delay variation calculation tool 1-9 uses a delay variation library 1-17 generated by the delay variation library generator 1-16 in correcting the circuit delay data within the SDF data 1-3. The SDF data 1-3 after the correction are referred to as the corrected SDF data 1-11, hereinafter. The circuit delay data of a specific instance described in the corrected SDF data 1-11 are used in timing verification for the specific instance when the variation of the power supply voltage of the specific instance is relatively large, more specifically, in the range from the reference level Va to the reference level Vb.

The jitter analyze tool 1-10 analyzes jitters caused by the dynamic noise (that is, the power supply variations) to generate jitter margin data 1-12 indicative of margins to be used in timing verification implemented by the STA tool 1-15. The magnitudes of the margins described in the jitter margin data 1-12 depends on the variations in the power supply voltages of the respective instances. The jitter margin data 1-12 are used for timing verification of specific ones of the instances in which the variations in the power supply voltages are relatively large.

The margin data generator module 1-13 generates margin data 1-14 indicative of margins to be used in timing verification implemented by the STA tool 1-15 for specific ones of the instances in which the variations in the power supply voltages are relatively small, more specifically, below the reference level Vb. The magnitudes of the margins described in the margin data 1-14 are constant regardless of the magnitude of the variation in the power supply voltage.

The delay variation generator 1-16 generates the delay variation library 1-17 and provides the delay variation library 1-17 for the delay variation calculation tool 1-9.

The STA tool 1-15 performs static timing analysis for the target circuit to thereby generate timing report data 1-18. As described later, the STA tool 1-15 uses the corrected SDF data 1-11 and the jitter margin data 1-12 for instances in which the power supply variations calculated by the power supply variation analysis tool 1-5 are relatively large, and uses the SDF data 1-3 and the margin data 1-14 for instances in which the power supply variations are relatively small.

The convergence analysis tool 1-19 determines on the basis of the timing report data 1-18 generated by the STA tool 1-15 whether the operation timing of the target circuit converges.

The SDF data 1-3, The power supply variation report data 1-5, the reference level data 1-6, the corrected SDF data 1-11, the jitter margin data 1-10, the margin data 1-12, the delay variation library 1-17, and the timing report data 1-18 are stored in a storage unit such as a hard disk drive and a memory device provided within the integrated circuit design apparatus.

The integrated circuit design apparatus described above may be implemented with software, hardware, or combinations thereof. In one embodiment, the integrated circuit design apparatus may be implemented as a computer such as an EWS (engineering workstation) onto which software programs are installed.

Figure 2:
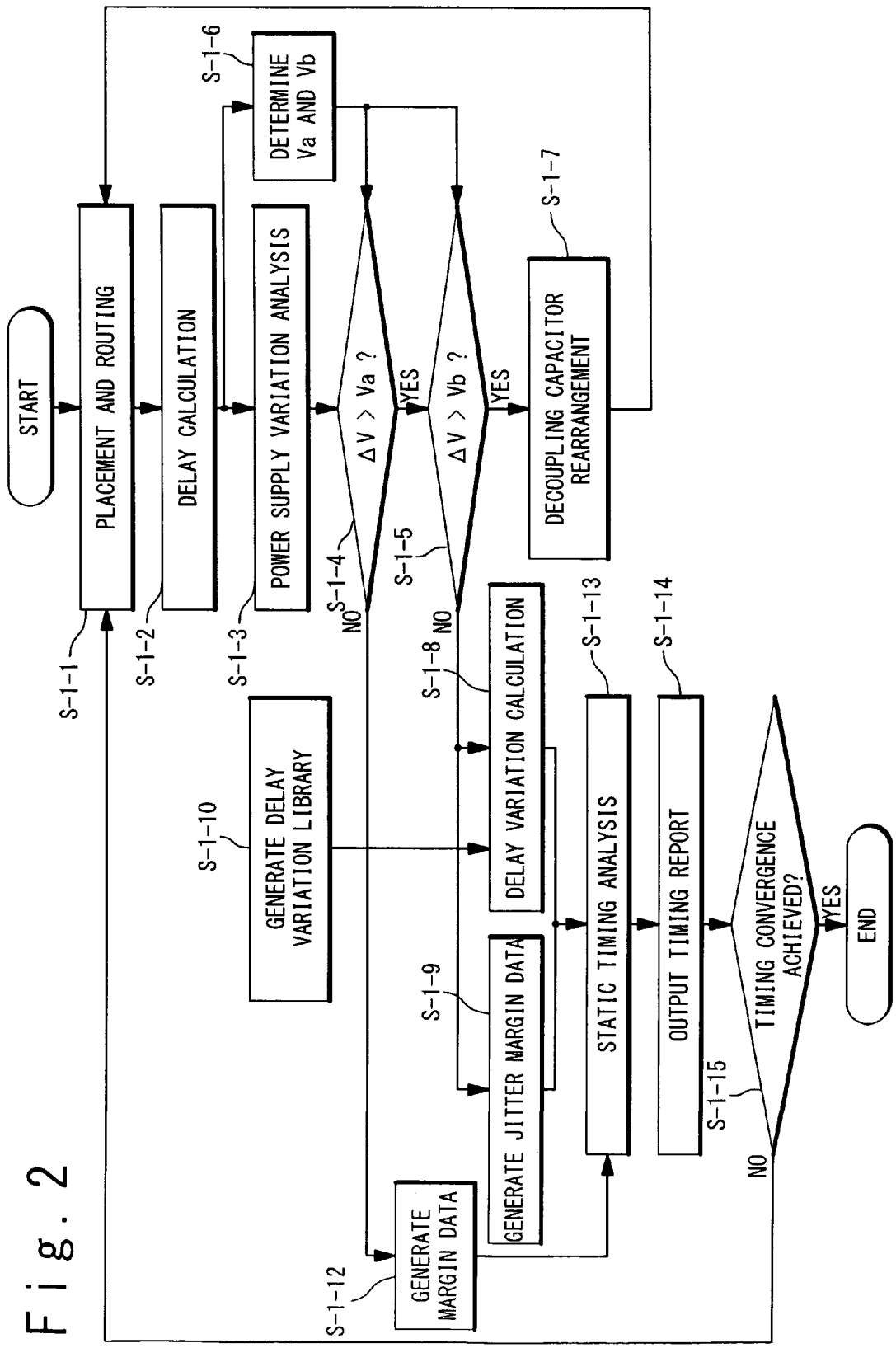
FIG. 2 is a flowchart showing an operation of the integrated circuit design apparatus of the first embodiment.

A description is given next of the circuit design procedure implemented by the integrated circuit design apparatus of the first embodiment, referring to FIG. 2. At the step S-1-1, the placement and routing tool 1-1 performs the placement and routing for instances, macros and the like within the target circuit to thereby generate the layout data of the target circuit.

At the step S-1-2, the delay calculation tool 1-2 performs delay calculation to thereby generate the SDF data 1-3 for the target circuit. The SDF data 1-3 include circuit delay data of the respective instances of the target circuit.

At the step S-1-3, the power supply variation analysis tool 1-4 performs power supply variation analysis for the target circuit on the basis of the layout data generated by the placement and routing tool 1-1 to generate the power supply variation report data 1-5. The power supply variation report data 1-5 are provided for the determination module 1-7.

At the step S-1-4, the determination module 1-7 determines whether the variations in the power supply voltages of the respective instances are larger than the reference level Va indicated by the reference level data 1-6. For instances in which the variations in the power supply voltages thereof are not larger than the reference level Va, the margin data generator module 13 generates the margin data 1-14 in which the margins are described as constant independently of the magnitude of the variation in the power supply voltage, at the step S-1-12. For instances in which the variations in the power supply voltages thereof are larger than the reference level Va, the procedure goes to the step S-1-5.

The reference level Va may be selected from a plurality of reference levels depending on the function of the target circuit. For examples, the reference level Va may be selected from a reference level V1 for the variation in the power supply voltage within the CPU core, a reference level V2 for the variation in the power supply voltage of the jitter, a reference level V3 for the variation in the power supply voltage within the analogue circuitry. In such case, minimum one out of the reference levels V1 to V3 are selected as the reference level Va. This is because the reference voltage Va is desirably determined depending on the susceptibility to the power supply variation.

At the step S-1-5, the determination module 1-7 determines whether the variations in the power supply voltages of the respective instances indicated by the power supply variation report data 1-5 outputted from the power supply variation analysis tool 1-4 are larger than the reference level Vb indicated by the reference level data 1-6. For instances in which the variations of the power supply voltages are not larger than the reference level Vb, the delay variation calculation tool 1-9 calculates delay variations caused by the dynamic noise (that is, the variations of the power supply voltages), and corrects the circuit delay data of the SDF data 1-3 on the basis of the calculated delay variations to generate the corrected SDF data 1-11 at the step S-1-8. Further, the jitter analyze tool 1-10 calculates jitter margins to generate the jitter margin data 1-12 at the step S-1-9 for the instances in which the variations of the power supply voltages are not larger than the reference level Vb.

At the step S-1-13, the STA tool 1-15 implements static timing analysis to provide timing verification for the target circuit, and thereby generates the timing report data 1-18 indicative of the result of the static timing analysis. In timing verification, the circuit delay data of the SDF data 1-3 and the margin data 1-14 are used for the instances in which the variations of the power supply voltages are not larger than the reference level Va, and the corrected circuit delay data of the corrected SDF data 1-11 and the jitter margin data 1-12 are used for the instances in which the variations of the power supply voltages are in the range between the reference level Va and Vb. At the step S-1-15, the STA tool 1-15 outputs the timing report data 1-18. At the step S-1-15, the convergence analysis tool 1-19 determines whether the timing of the target circuit converges successfully. If the timing converges successfully (that is, no timing error is found), the procedure is completed. If the timing does not converge (that is, one or more timing errors are found), the procedure returns to the step S-1-1 and the design procedure restarts from the placement and routing. In this case, additional constraint conditions, such as addition of decoupling capacitances, may be provided for the placement and routing tool 1-1, so that the timing of the target circuit converges as a result of modifications in the placement and routing.

If at least one of the variations in the power supply voltages of the instances of the target circuit is larger than the reference level Vb, the redesign module 1-8 performs the redesign of the target circuit. In such case, it would be apparent without timing verification that the target circuit will suffer from a timing error with high possibility. Therefore, at the step S-1-7, the power supply variation report data 1-5 is fed to the redesign module 1-8, and the redesign module 1-8 offers design modification, such as optimization of the decoupling capacitances. The result of the redesign is fed back to the placement and routing tool 1-1. Namely, the timing verification is omitted and the redesign is directly made when the power supply variation is large, thereby saving time for the unnecessary timing analysis.

[Detail of Power Supply Variation Analysis]

Figure 3:
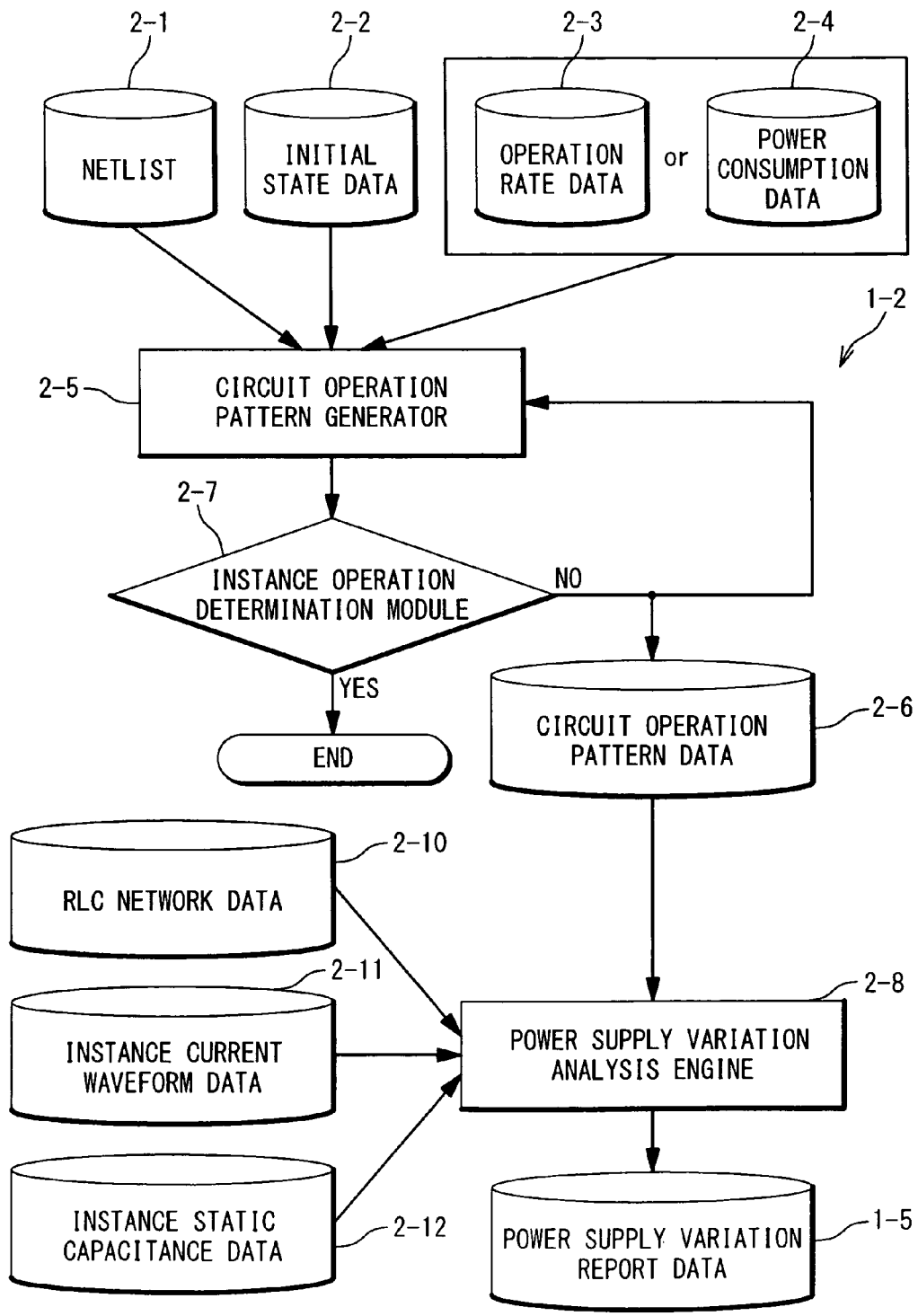
FIG. 3 is a block diagram showing a configuration of a power supply variation analysis tool of the first embodiment.

A description is given next of details of the power supply variation analysis. FIG. 3 is a block diagram showing a detailed configuration of the power supply variation analysis tool 1-4 in the first embodiment. The power supply variation analysis tool 1-4 includes a circuit operation pattern generator 2-5, a power supply variation analysis engine 2-8, and an instance operation determination module 2-7.

The circuit operation pattern generator 2-5 generates a circuit operation pattern used in the power supply variation analysis implemented by the power supply variation analysis engine 2-8 on the basis of a netlist 2-1 and initial state data 2-2, and then generates circuit operation pattern data 2-6 indicative of the generated circuit operation pattern. Here, the netlist 2-1 is circuit connection data indicative of the connectivity of the target circuit. The initial state data 2-2 is indicative of initial states of respective nodes within the target circuit. Further as described later, operation rate data 2-3 and/or power consumption data 2-4 may be additionally fed to the circuit operation pattern generator 2-5, wherein the operation rate data 2-3 are indicative of The operation rate data 2-3 describes operation rates of the respective instances, and the power consumption data 2-4 are indicative of the consumption power of the target circuit. It should be noted that the "operation rate" means the number of times for a specific instance to switch the state thereof per clock cycle. For example, the operation rate of a specific instance is 0.5 when the specific instance switches the state thereof once for two clock cycles. The operation rate data 2-3 and/or the power consumption data 2-4 may be prepared in advance in consideration of the operation rates and power consumption in actual operations.

The instance operation determination module 2-7 determines whether all instances operate at least once when the target circuit operates in accordance with the circuit operation pattern described in the circuit operation pattern data 2-6 generated by the circuit operation pattern generator 2-5. The circuit operation pattern generator 2-5 repeatedly generates the circuit operation pattern in a try-and-error fashion until the circuit operation pattern generator 2-5 successfully generates the circuit operation pattern so as to operate all the instances at least once. The power supply variation analysis engine 2-8 performs power supply variation analysis on the basis of the circuit operation pattern data 2-6. The power supply variation analysis is also based on RLC network data 2-10, instance current waveform data 2-11, and instance static capacity data 2-12, which are extracted from the layout data generated by the placement and routing tool 1-1. The result of the power supply variation analysis is outputted as the power supply variation report data 1-5.

Figure 9:
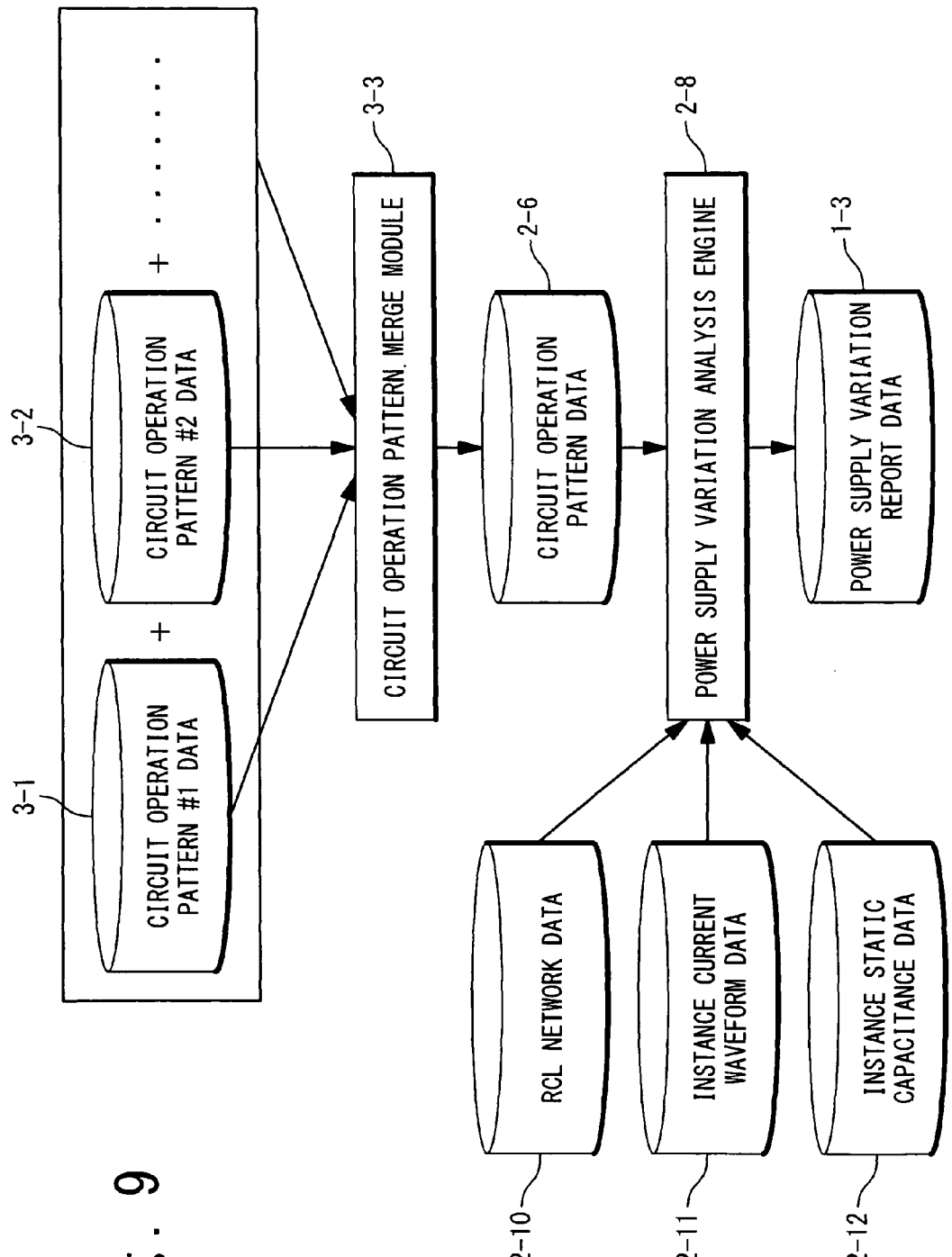
FIG. 9 is a block diagram showing another configuration of the power supply variation analysis tool in the first embodiment.

The circuit operation pattern generator 2-5 may include a circuit operation pattern merge module 3-3 as shown in FIG. 9. The circuit operation pattern merge module 3-3 merges or combines circuit operation pattern data 3-1, 3-2, . . . each indicative of a circuit operation pattern to generate the circuit operation pattern data 2-6. The power supply variation analysis engine 2-8 performs the power supply variation analysis on the basis of the circuit operation pattern data 2-6.

Figure 6:
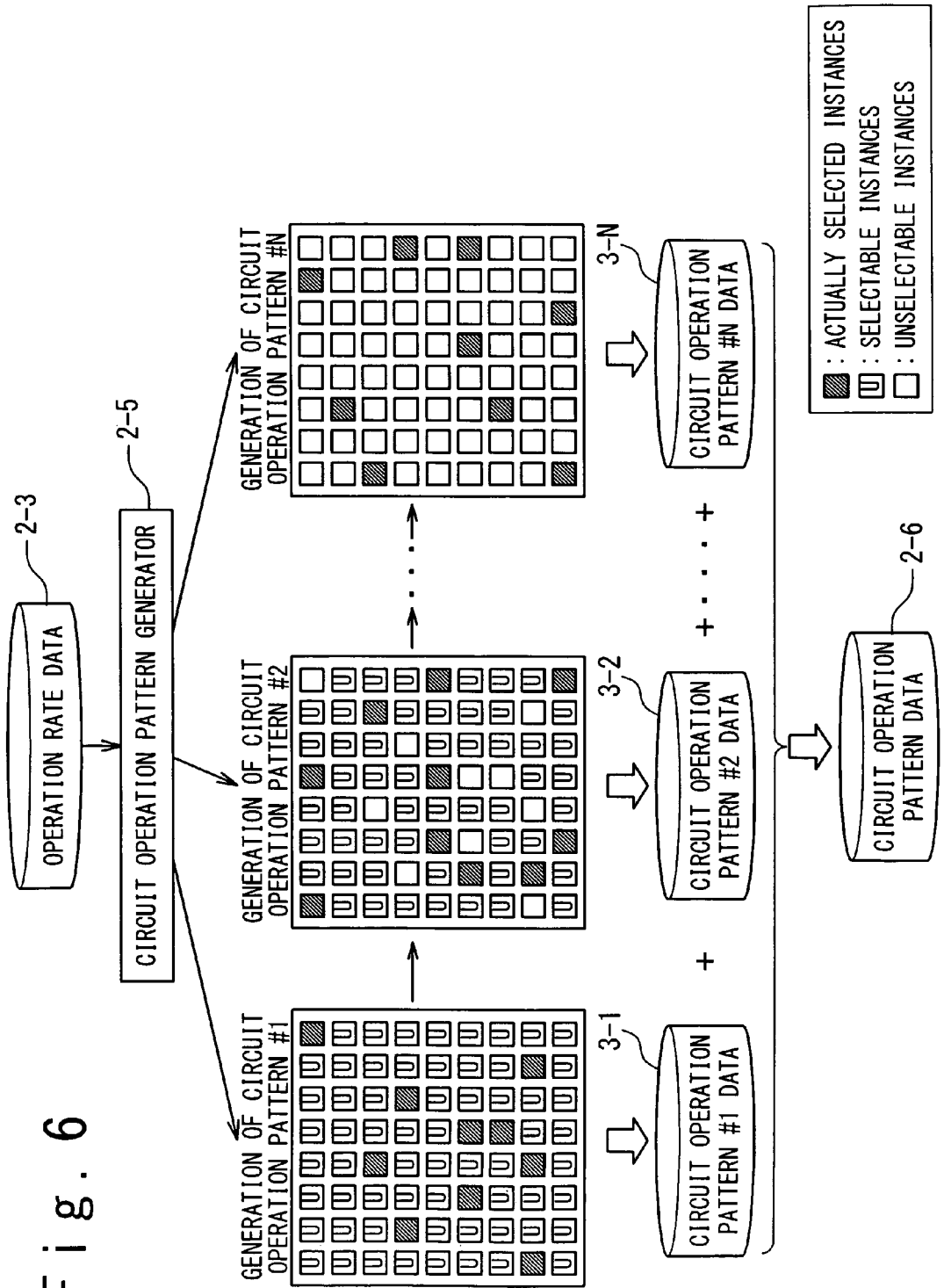
FIG. 6 is a schematic diagram showing a method of generating circuit operation pattern data through combining a plurality of circuit operation patterns in the first embodiment.

The circuit operation pattern merge module 3-3 allows separately-generated circuit operation patterns to be combined into one circuit operation pattern. For example, as shown in FIG. 6, a first circuit operation pattern is generated to allow selected instances to be operated, and then a second circuit operation pattern is generated to allow other selected instances to be operated. In this way, N circuit operation patterns are generated and then the N circuit operation patterns are combined to thereby generate the circuit operation pattern data 2-6 so as to allow all the instances to operate at least once.

Figure 7:
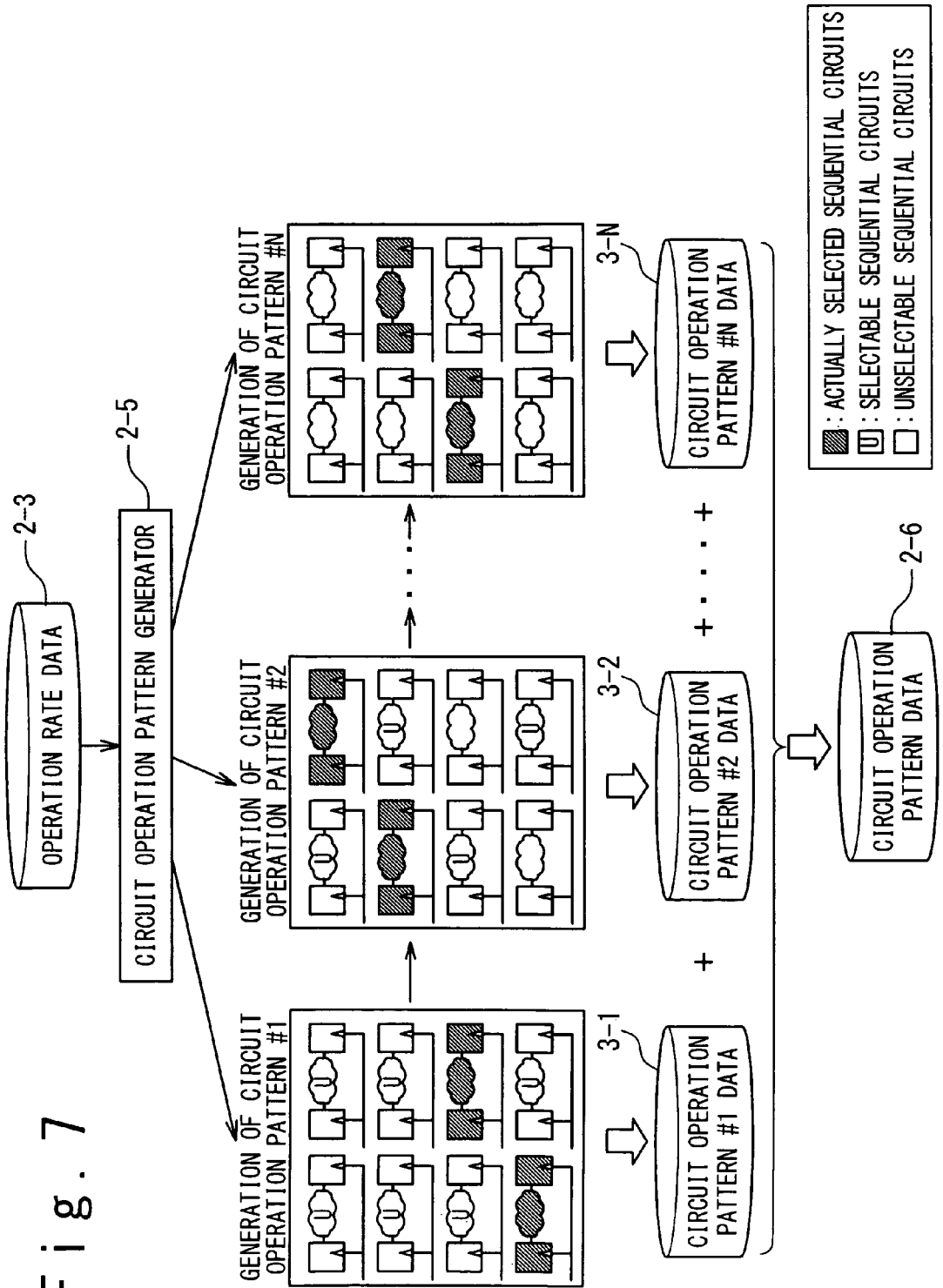
FIG. 7 is a schematic diagram showing another method of generating circuit operation pattern data based on operation rate data through combining a plurality of circuit operation patterns in the first embodiment.

In some cases, it is desirable that the circuit operation pattern data 2-6 are generated in view of the operation rate data 2-3 and/or the power consumption data 2-4. When the target circuit is provided with a scan path test circuitry including chains of sequential circuits, for example, one possible circuit operation pattern is a pattern which causes all the sequential circuits to operate simultaneously in connection with the operation of the scan paths. In actual operations, however, all the sequential circuits do not operate simultaneously. Therefore, the power supply variation analysis in consideration of the operation in which all the sequential circuits operate simultaneously may lead to estimating an excessively large power supply variation, often resulting in defining excessive margins in design verification of the target circuit. The use of the operation rate data 2-3 and/or the power consumption data 2-4 effectively avoids such problem; the operation rate data 2-3 and/or the power consumption data 2-4 provides restriction conditions of the maximum number of sequential circuits operating simultaneously, avoiding the generation of a circuit operation pattern in which the operation rate and power consumption are excessively higher than those in actual operations. This effectively prevents the power supply variation analysis and timing verification based on excessive margins. FIG. 7 shows an example of the circuit operation pattern data 2-6 in which the number of sequential circuits operating simultaneously is restricted on the basis of the operation rate data 2-3. A circuit operation pattern in which all of the sequential circuits operate simultaneously may be possible in connection with the operation of the scan path test circuit; however, the assumption that all the sequential circuits operate simultaneously would lead to estimating an excessively large power supply variation, resulting in excessive margins. In FIG. 7, such problem is avoided. Namely, circuit operation patterns in which the number of sequential circuits operating simultaneously is restricted are generated. The generated circuit operation patterns are combined later into the circuit operation pattern data 2-6 which allows all the sequential circuits to operate at least once. In FIG. 7, hatchings indicate sequential circuits actually selected to operate in the respective circuit operation patterns, and the symbols "U" indicates sequential circuits which are selectable (but not actually selected) as sequential circuits which operate in the respective circuit operation patterns. White boxes indicate sequential circuits selected not to operate the respective circuit operation patterns.

Figure 8:
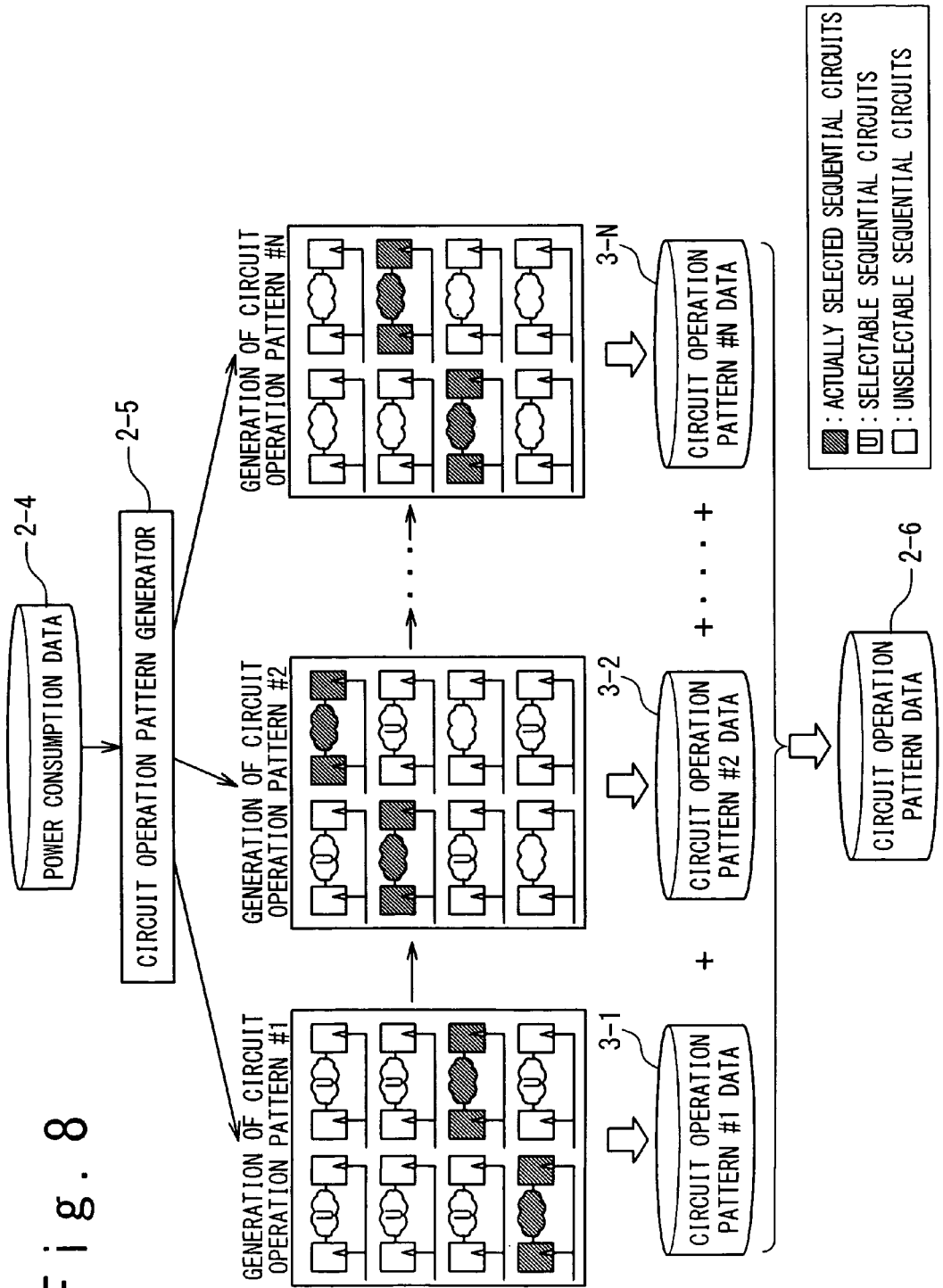
FIG. 8 is a schematic diagram showing still another method of generating circuit operation pattern data based on power consumption data in the first embodiment.

In an alternative embodiment, as shown in FIG. 8, the power consumption data 2-4 may be used in place of the operation rate data 2-3 in order to provide restriction conditions of the maximum number of sequential circuits operating simultaneously. The circuit operation pattern data 2-6 are generated by combining circuit operation pattern data 3-1 to 3-N each indicative of one circuit operation pattern.

A description is next given in detail of a circuit operation pattern generated by combining a plurality of circuit operation patterns thereinto, referring to FIG. 11. In FIG. 11, a resultant circuit operation pattern is generated by combining circuit operation patterns #1 to #4, wherein the circuit operation pattern #1 allows instances #1 to 4 to operate, the circuit operation pattern #2 allows instances #5 to #8 to operate, and the circuit operation pattern #3 allows instances #9 to #12 to operate. In the resultant circuit operation pattern, only the instances #1 to #4 operate in the first cycle; the instances #5 to #12 do not operate in the first cycle. Likewise, only the instances #5 to #8 operate in the second cycle, and only the instances 9 to 12 operate in the third cycle. As thus described, the maximum number of instances operating simultaneously is restricted to or below a predetermined number based on the operation rate data 2-3 and/or the power consumption data 2-4. In the example shown in FIG. 11, the maximum number of instances allowed to operate simultaneously is four. As shown in FIG. 12, a circuit operation pattern used in power supply variation analysis which covers a long analysis time may be generated by repeatedly combining a plurality of circuit operation patterns.

In this way, the circuit operation pattern merge module 3-3 outputs one circuit operation pattern data thus combined and the power supply variation analysis tool 3-5 can analyze the power supply voltage change based on the combined circuit operation pattern data.

Figure 4:
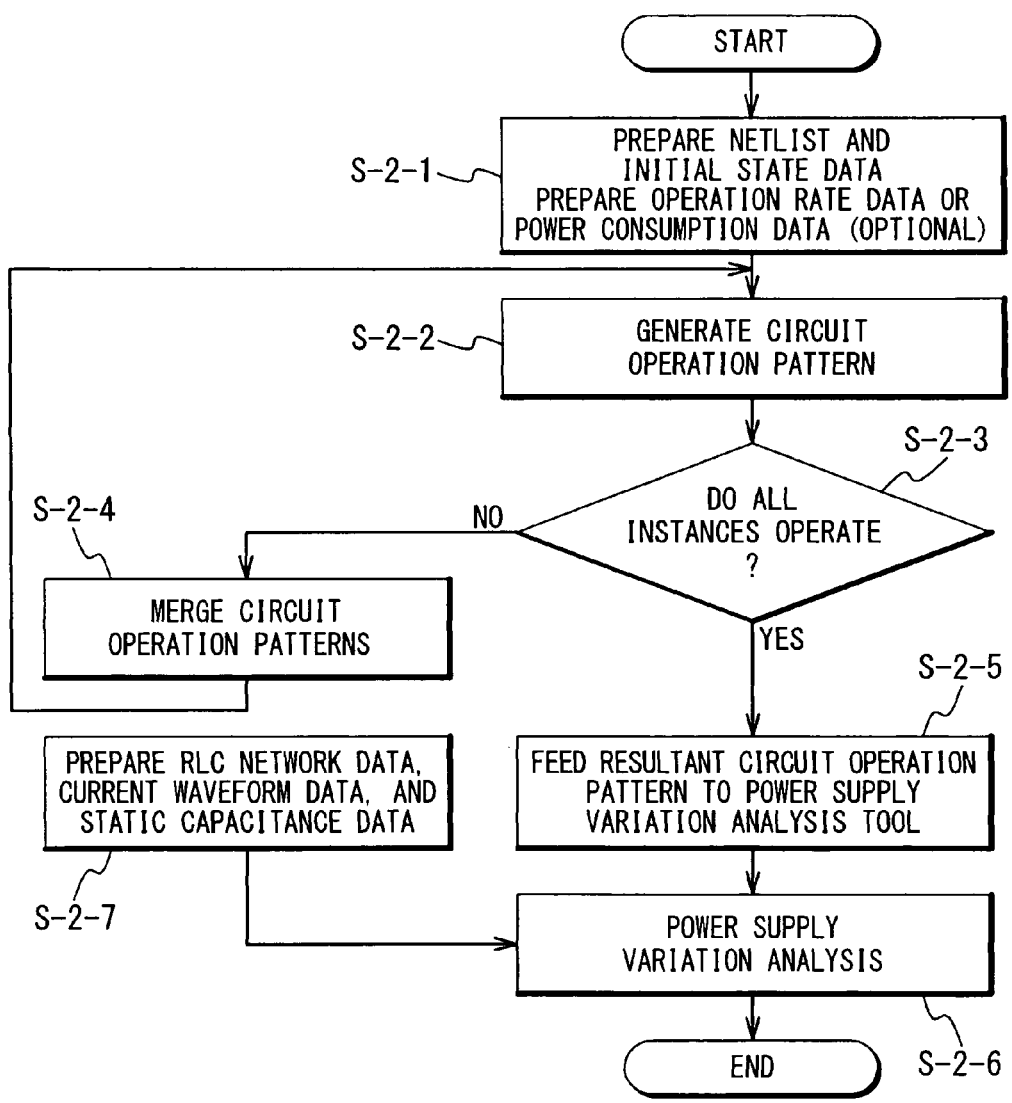
FIG. 4 is a flowchart showing an operation of the power supply variation analysis tool in the first embodiment.
Figure 5:
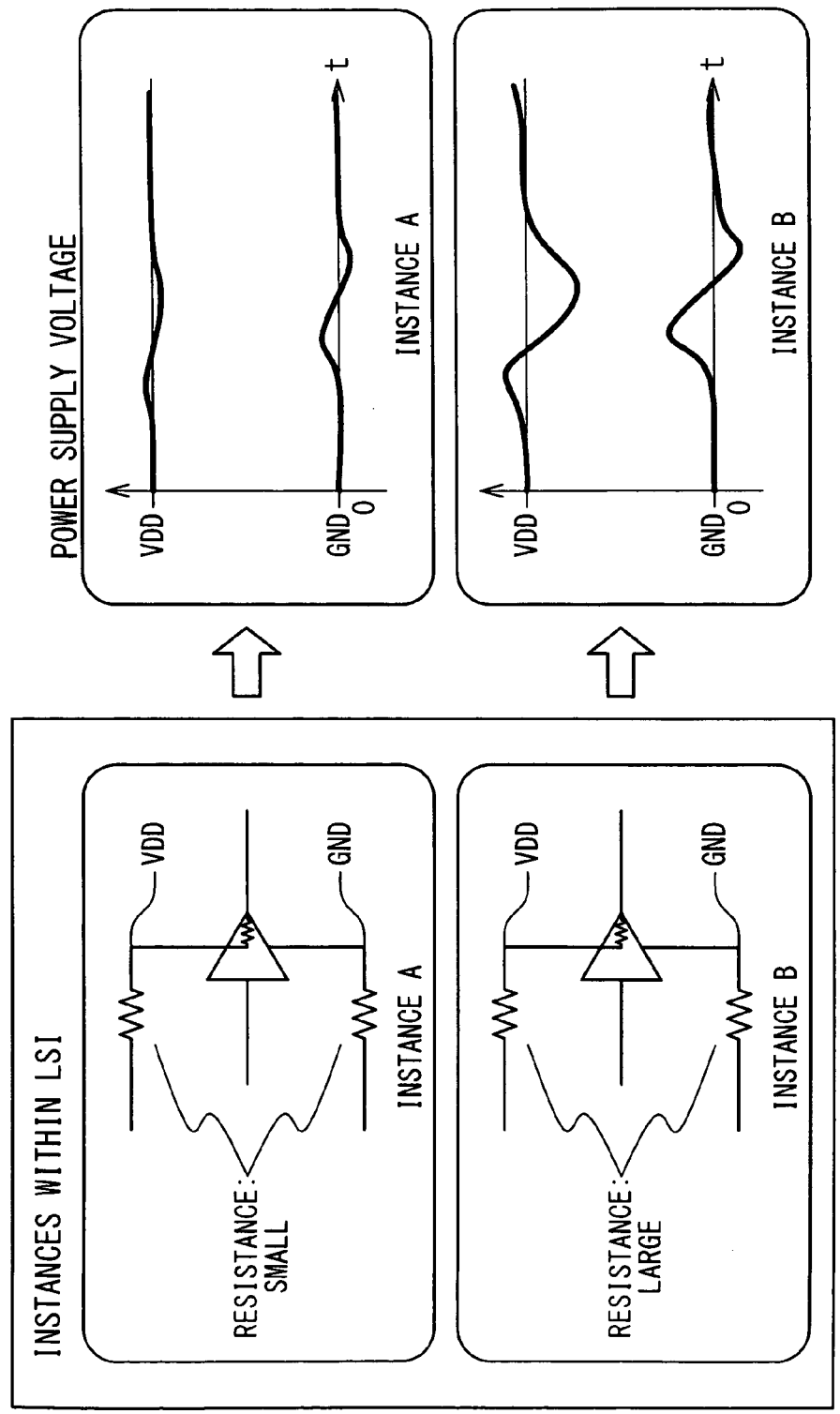
FIG. 5 is a schematic diagram showing models of power supply variation analysis.

A description is given next of the operation of the power supply variation analysis tool 1-2 referring to FIG. 4, which shows an operation flowchart of the power supply variation analysis tool 1-2.

At the step S-2-1, the netlist 2-1 and the initial state data 2-2 are provided for the power supply variation analysis tool 1-2. In addition, the operation rate data 2-3 and/or the power consumption data 2-4 are provided for the power supply variation analysis tool 1-2.

At the step S-2-2, the circuit operation pattern generator 2-5 determines the maximum number of instances allowed to operate simultaneously for each clock cycle on the basis of the operation rates indicated by the operation rate data 2-3 and/or the power consumption indicated by the power consumption data 2-4, and generates a circuit operation pattern based on the determined maximum number of the instances allowed to operate simultaneously. It should be noted that the circuit operation pattern indicates which instance operates in which clock cycle.

At the step S-2-3, the circuit operation pattern generator 2-5 determines whether the circuit operation pattern generated at the step S-2-2 is generated so that all the instances operate at least once. When the circuit operation pattern generated at the step S-2-2 do not allow all the instances to operate at least once, the circuit operation pattern generator 2-5 generate a supplemental circuit operation pattern and merge the newly-generated circuit operation pattern into the previously-generated circuit operation pattern at step S-2-4. It should be noted that the circuit operation pattern generator 2-5 generates the supplemental circuit operation pattern at the step S-2-4 so that the supplemental circuit operation pattern allows instances which do not operate in accordance with the previously-generated circuit operation pattern to operate. The steps S-2-3 and S-2-4 are repeated until the circuit operation pattern generator 2-5 successfully generates a circuit operation pattern in which all the instances are allowed to operate at least once. When a circuit operation pattern which allows all the instances to operate at least once is successfully generated, the circuit operation pattern generator 2-5 completes the circuit operation pattern generation.

At the step S-2-5, the generated circuit operation pattern is fed to the power supply variation analysis engine 2-8. At the step S-2-7, the RLC network data 2-10, the instance current waveform data 2-11, and the instance static capacity data 2-12 are fed to the power supply variation analysis engine 2-8. At the step S-2-6, the power supply variation analysis engine 2-8 performs power supply variation analysis and outputs the power supply variation report data 1-5.

Figure 10:
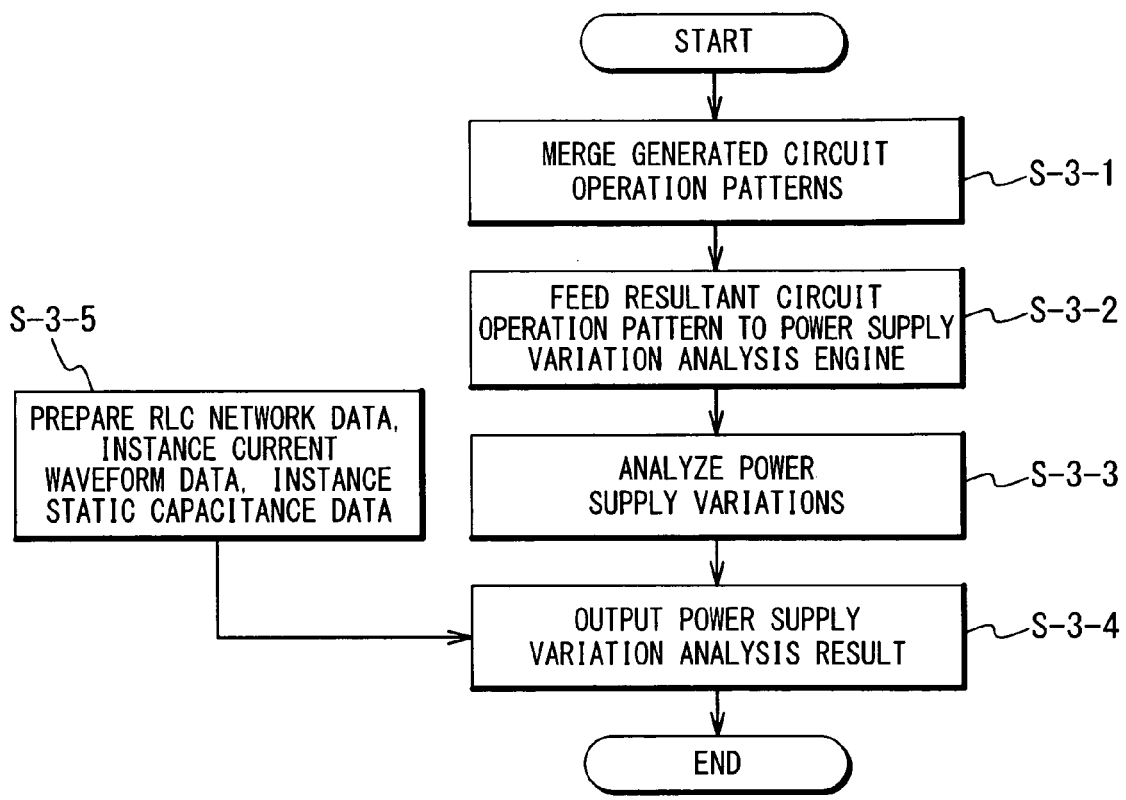
FIG. 10 is a flowchart showing the operation of the power supply variation analysis tool shown in FIG. 9 in the first embodiment.

In FIG. 4, the determination is made at the step S-2-3 with respect to one circuit operation pattern generated by combining a newly-generated circuit operation pattern to a previously-generated circuit operation pattern at step the S-2-4. Alternatively, a plurality of circuit operation patterns are generated so that the generated circuit operation patterns allows all the instances to operate at least one in total, and then the generated circuit operation patterns are combined to generate a resultant circuit operation pattern. FIG. 10 shows a flowchart related to this alternative.

[Generation of Delay Variation Library]

A description is given next of generation of the delay variation library 1-15 by the delay variation library generator 1-16 shown in FIG. 1.

Figure 13:
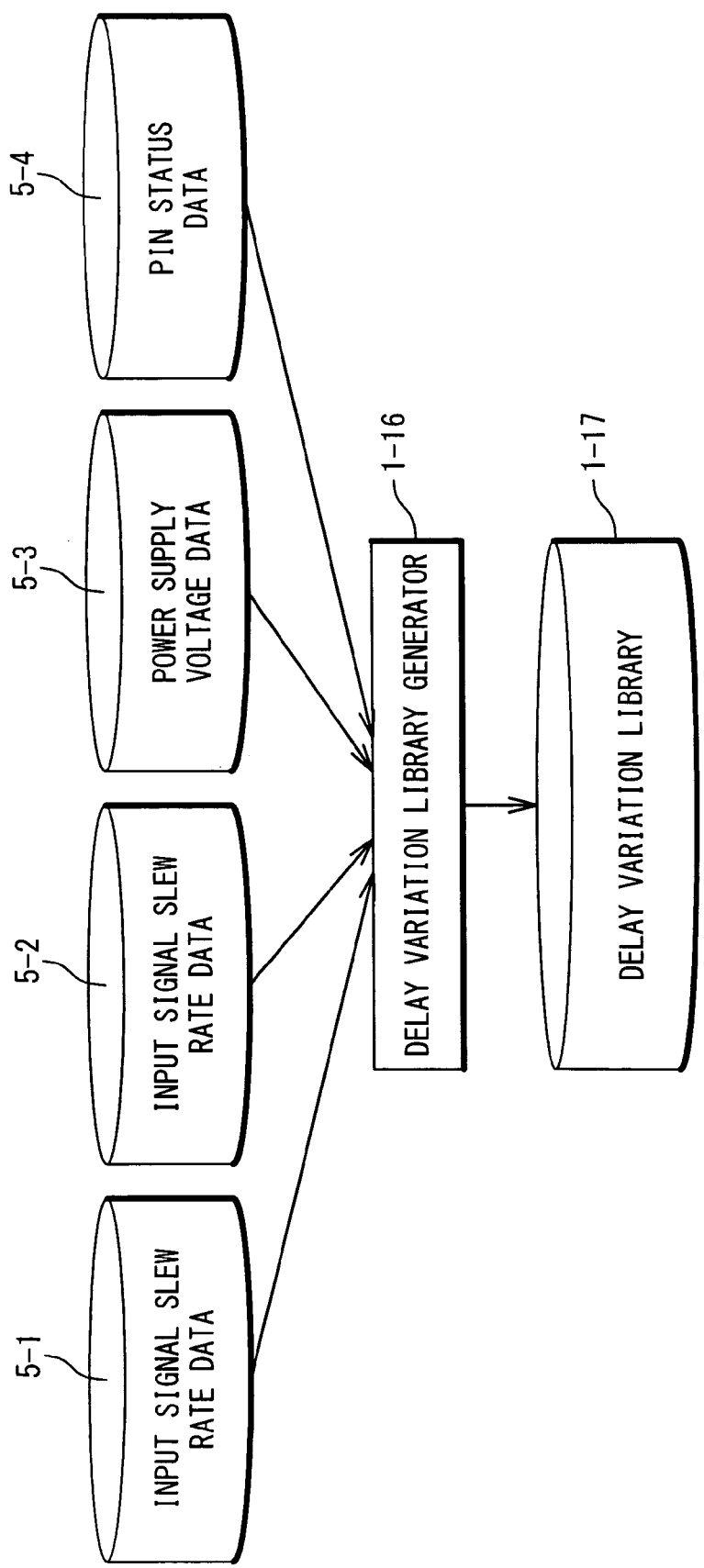
FIG. 13 is a block diagram showing a configuration of a delay variation library generator in the first embodiment.

FIG. 13 is a block diagram showing the configuration of the delay variation library generator 1-16. Input signal slew rate data 5-1, output load capacitance data 5-2, power supply voltage data 5-3, and pin state data 5-4 stored in the storage unit of the integrated circuit design apparatus 1 are fed to the delay variation library generator 1-16. The delay variation library generator 1-16 generates the delay variation library 1-17 from the input signal slew rate data 5-1, the output load capacitance data 5-2, the power supply voltage data 5-3, and the pin state data 5-4. One feature of the delay variation library generation in the first embodiment is that the delay variation library 1-17 is generated in view of states of pins of the respective instances.

Figure 14:
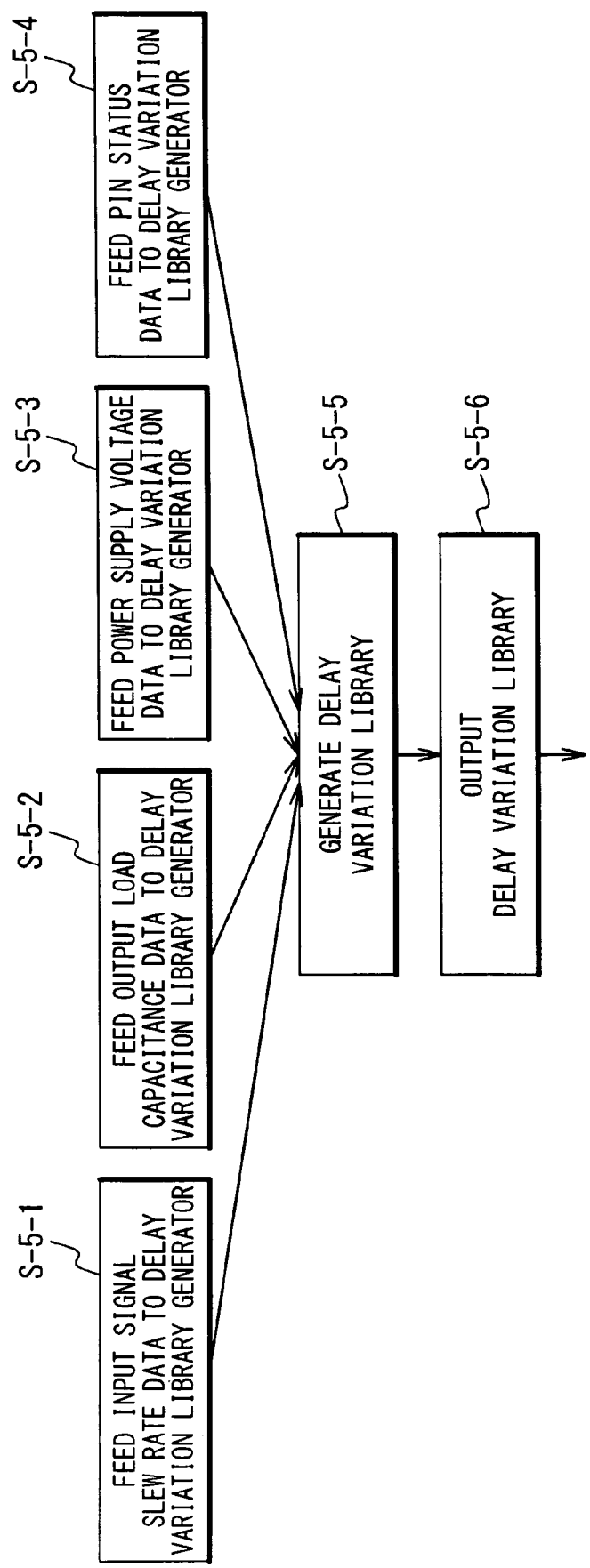
FIG. 14 is a flowchart showing an operation of the delay variation library generator in the first embodiment.

FIG. 14 shows the operation of the delay variation library generator 1-16. At the step S-5-1, input signal slew rate data 5-1, which are indicative of slew rates of input signals, are fed to the delay variation library generator 1-16. At the step S-5-2, the output load capacitance data 5-2, which are indicative of output load capacitances, are fed to the delay variation library generator 1-16. At the step S-5-3, the power supply voltage data 5-3, which are indicative of variations in the power supply voltage, are fed to the delay variation library generator 1-16. At the step S-5-4, the pin status data 5-4, which are indicative of the states of pins of the respective instances, are fed to the delay variation library generator 1-16. At the step S-5-5, the delay variation library generator 1-16 calculates the delay variations by circuit simulation for the respective kinds of instances, with the input signal slew rates, the output load capacitances, the power supply voltages, and the states of pins varied over desired ranges. The result of the calculation is archived in the delay variation library 1-17.

Figure 15:
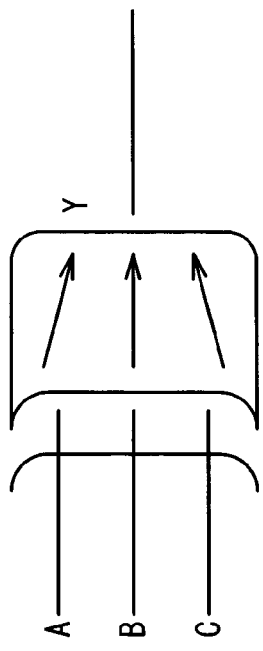
FIG. 15 is a schematic diagram showing contents of the delay variation library in the first embodiment.

A detailed description is given of the generation of the delay variation library 1-17 referring to FIG. 15. FIG. 15 shows the delay variation data described in the delay variation library 1-17 for a combinational circuit having three input pins A, B, and C and an output pin Y. The input signals are fed to the pins A, B, and C and the output signal is outputted from the output pin Y. The generation of the delay variation data for a certain kind of instance (target instance) involves steps (1-1) to (1-3) as follows:

Step (1-1):

The delay variation library generator 1-16 generates input/output patterns for all the timing arcs involved in signal transition on the basis of the input signal slew rate data 5-1, the output load capacitance data 5-2, the power supply voltage data 5-3, and the pin state data 5-4. It should be noted that the timing arc is the timing path from any input to any output.

Step (1-2):

The delay variation library generator 1-16 calculates variations in the delay times of the target instance caused by the variations in the power supply voltage and the ground voltage with the power supply and ground voltages varied over desired voltage ranges for respective allowed states of the input pins. In FIG. 15, the variations in the delay times are indicated by the "delay 11", "delay 12", . . . , "delay 21", "delay 21", . . . , "delay 31", and "delay 32", Step (1-3):

The delay variation library generator 1-16 defines a delay variation function which represents the variation in the delay time against the variations in the power supply and ground voltages for each allowed input pin state. The delay variation functions are defined by using the least square method. In this embodiment, the delay variation functions are expressed by delay variation factors DF which are the ratio of the variation in the delay time to the variations in the power supply and ground voltages.

The delay variation library generator 1-16 implements the steps (1-1) to (1-3) for all the possible states of the input pins with the differences between the power supply and ground voltages varied, to thereby complete the delay change delay variation library 1-17 shown in FIG. 15.

The delay variation calculation tool 1-9 calculates the variations in the delay times of the respective instances within the target circuit by assigning the variation in the power supply voltage calculated by the power supply variation analysis tool 1-2 to the delay variation function described in the delay variation library 1-15. The delay variation calculation tool 1-9 then corrects the SDF data 1-3 in accordance with the calculated variations in the delay times of the respective instances to generate the corrected SDF data 1-11.

Second Embodiment

In a second embodiment, the integrated circuit design apparatus is configured to implement delay variation calculation on the basis of the power supply current Ivdd and the ground current Ignd in addition to the variation in the power supply voltage.

Figure 16:
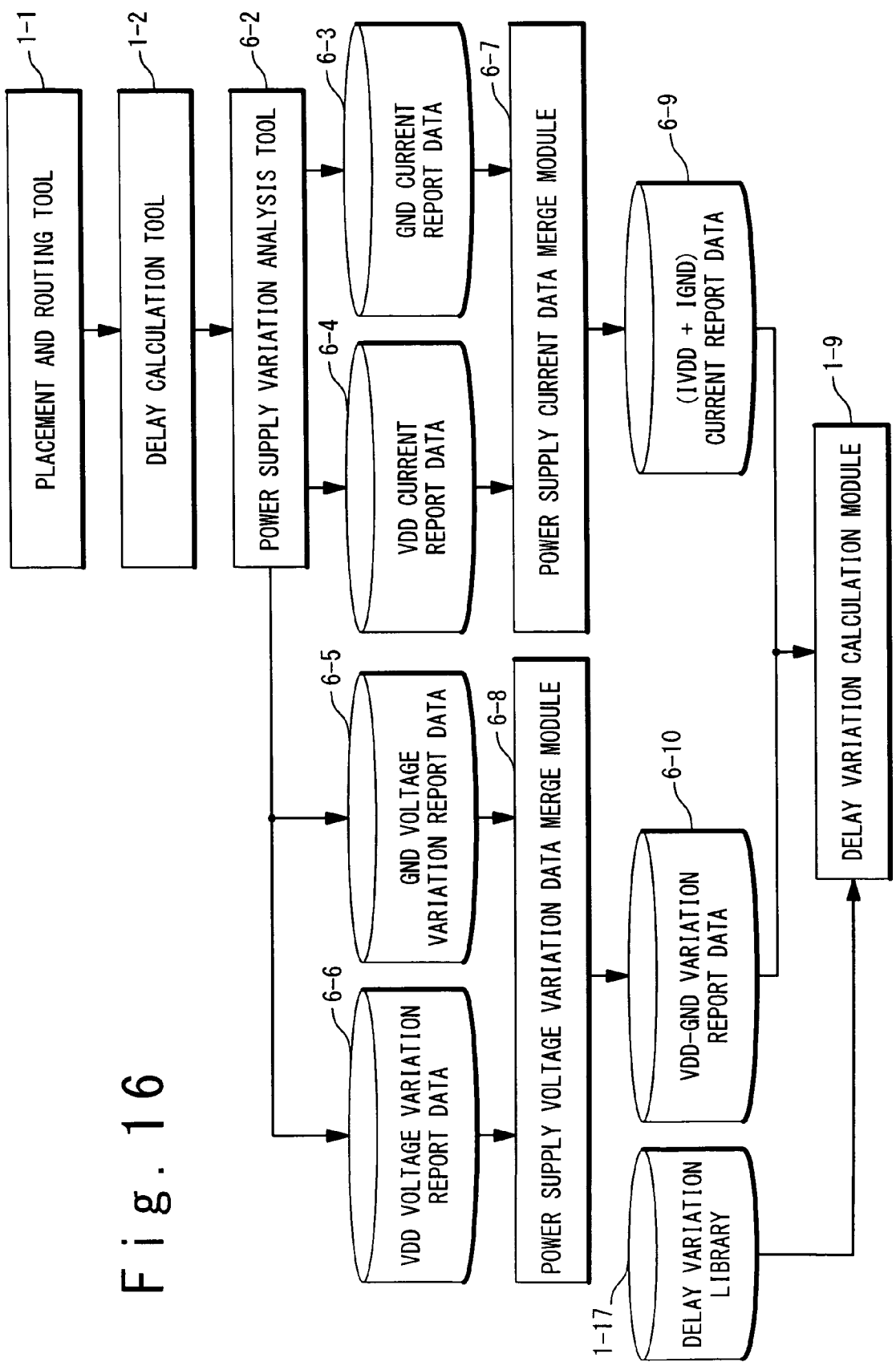
FIG. 16 is a schematic diagram showing a major part of an integrated circuit design apparatus in a second embodiment of the present invention.

FIG. 16 is a block diagram showing the main part of the integrated circuit design apparatus of the second embodiment. The integrated circuit design apparatus of the second embodiment is identical in the configuration and operation to that of the first embodiment shown in FIGS. 1 and 3 except for including a power supply variation analysis tool 6-2, a power supply current data merge module 6-7, a power supply voltage variation data merge module 6-8, and a delay variation calculation tool 6-11 in place of the power supply variation analysis tool 1-4, the delay variation calculation tool 1-9. In FIG. 16, components of the integrated circuit design apparatus which are identical in the configuration and operation to those shown in FIGS. 1 and 3 may be not shown for simplicity, and descriptions thereof are not given in the following.

In the integrated circuit design apparatus shown in FIG. 16, the power supply variation analysis tool 6-2 performs power supply voltage variation analysis on the basis of the RLC network data 2-10, instance current waveform data 2-11, instance static capacitance data 2-12, and the circuit operation pattern data 2-6, which are extracted from the layout data generated by the placement and routing tool 1-1, to generate power supply voltage variation report data 6-6 and ground voltage variation report data 6-5. The power supply voltage variation report data 6-6 are indicative of the variations in the power supply voltages of the respective instances, and the ground voltage variation report data 6-5 are indicative of the variations in the ground voltages of the respective instances. Further, the power supply variation analysis tool 6-2 also generates power supply current report data 6-4 and ground current report data 6-3. The power supply current report data 6-4 are indicative of the variations in the power supply currents Ivdd of the respective instances, and the ground current report data 6-3 are indicative of the variations in the ground currents Ignd of the respective instances. The power supply current data merge module 6-7 merges the ground current report data 6-3 and the power supply current report data 6-4 to generate (Ivdd+Ignd) current report data 6-9 which are indicative of the variations in the sum of the power supply currents Ivdd and the ground currents Ignd of the respective instances for each unit time period (simply referred to as, Ivdd+Ignd). The power supply voltage variation data merge module 6-8 merges the power supply voltage variation report data 6-6 and the ground voltage variation report data 6-5 to generate (VDD-GND) variation report data 6-10 which are indicative of the variations in the differences between the power supply voltages and the ground voltages within the respective instances for each unit time period (simply referred to as VDD-GND, hereinafter). The delay variation calculation tool 6-11 performs delay variation calculation on the basis of the (Ivdd+Ignd) current report data 6-9, the (VDD-GND) variation report data 6-10, and the delay variation library 1-17, and corrects the SDF data 1-3 in accordance with the result of the delay variation calculation to generate the corrected SDF data 1-11.

Figure 17:
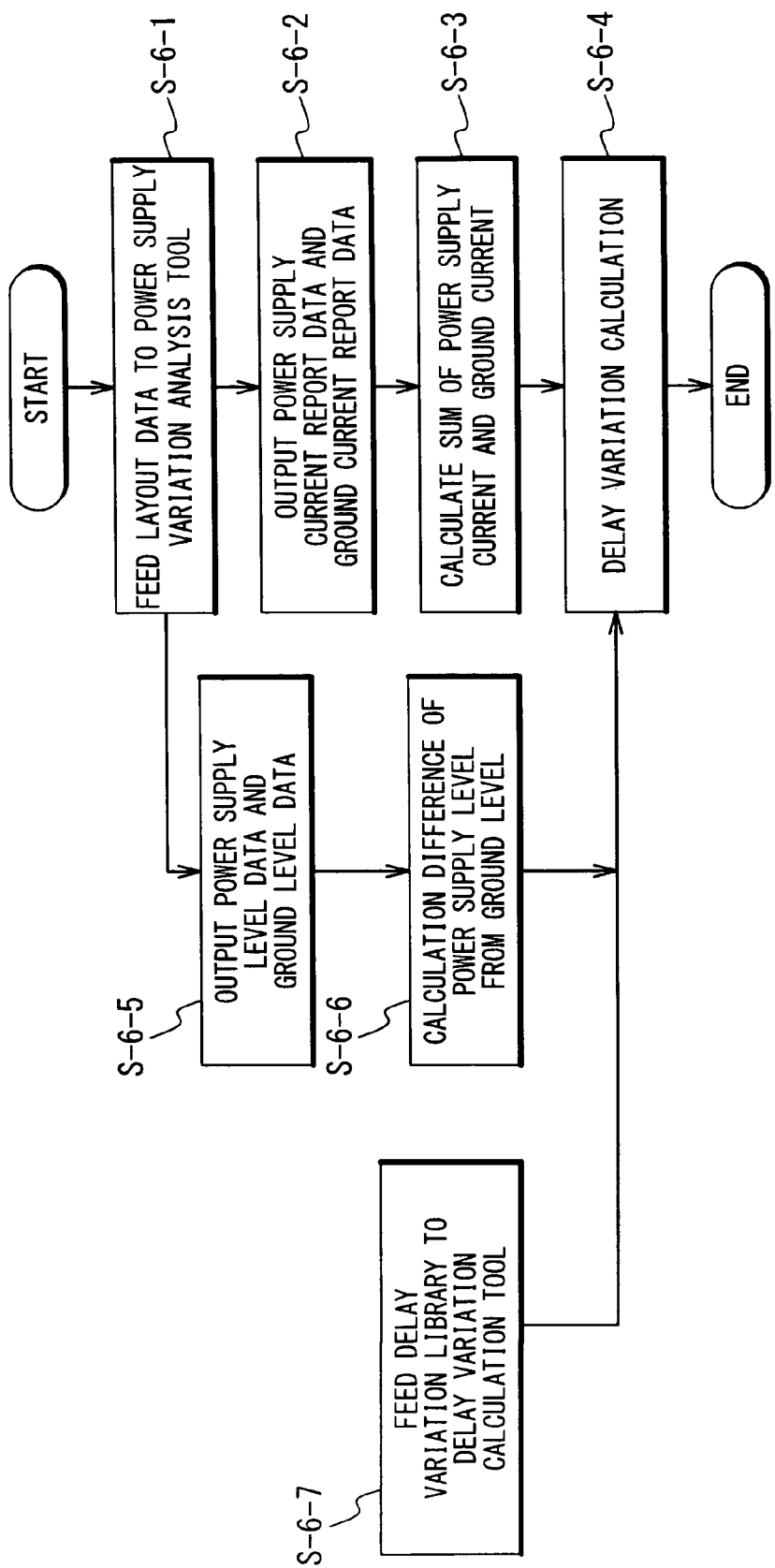
FIG. 17 is a flowchart showing an operation of the integrated circuit design apparatus in the second embodiment.

A description is given next of the procedure of the delay variation calculation in the second embodiment, referring to the flowchart of FIG. 17. At the step S-6-1, the layout data generated by the placement and routing tool 1-1 is fed to the power supply variation analysis tool 6-2. At the step S-6-2, the power supply variation analysis tool 6-2 analyzes the power supply and ground currents for the target circuit operation pattern, and generates the power supply current report data 6-4 and the ground current report data 6-3. At the step S-6-3, the power supply current data merge module 6-7 merges the ground current report data 6-3 and the power supply current report data 6-4 to generate the (Ivdd+Ignd) current report data 6-9 which are indicative of the variations in Ivdd+Ignd (that is, the sums of the power supply currents Ivdd and the ground currents Ignd of the respective instances), and feeds the (Ivdd+Ignd) current report data 6-9 to the delay variation calculation tool 6-11. At the step S-6-5, the power supply variation analysis tool 6-2 analyzes the variations in the power supply voltages and the ground voltages of the respective instances to generate the power supply voltage variation report data 6-6 and the ground voltage variation report data 6-5. At the step S-6-6, the power supply voltage variation data merge module 6-8 merges the power supply voltage variation report data 6-6 and the ground voltage variation report data 6-5 to generate the (VDD-GND) variation report data 6-10 which are indicative of the variations in VDD-GND (that is, the variations in the differences between the power supply voltages and the ground voltages of the respective instances). The (VDD-GND) variation report data 6-10 are fed to the delay variation calculation tool 6-11. At the step S-6-7, the delay variation library 1-17 is fed to the delay variation calculation tool 6-11.

Figure 18:
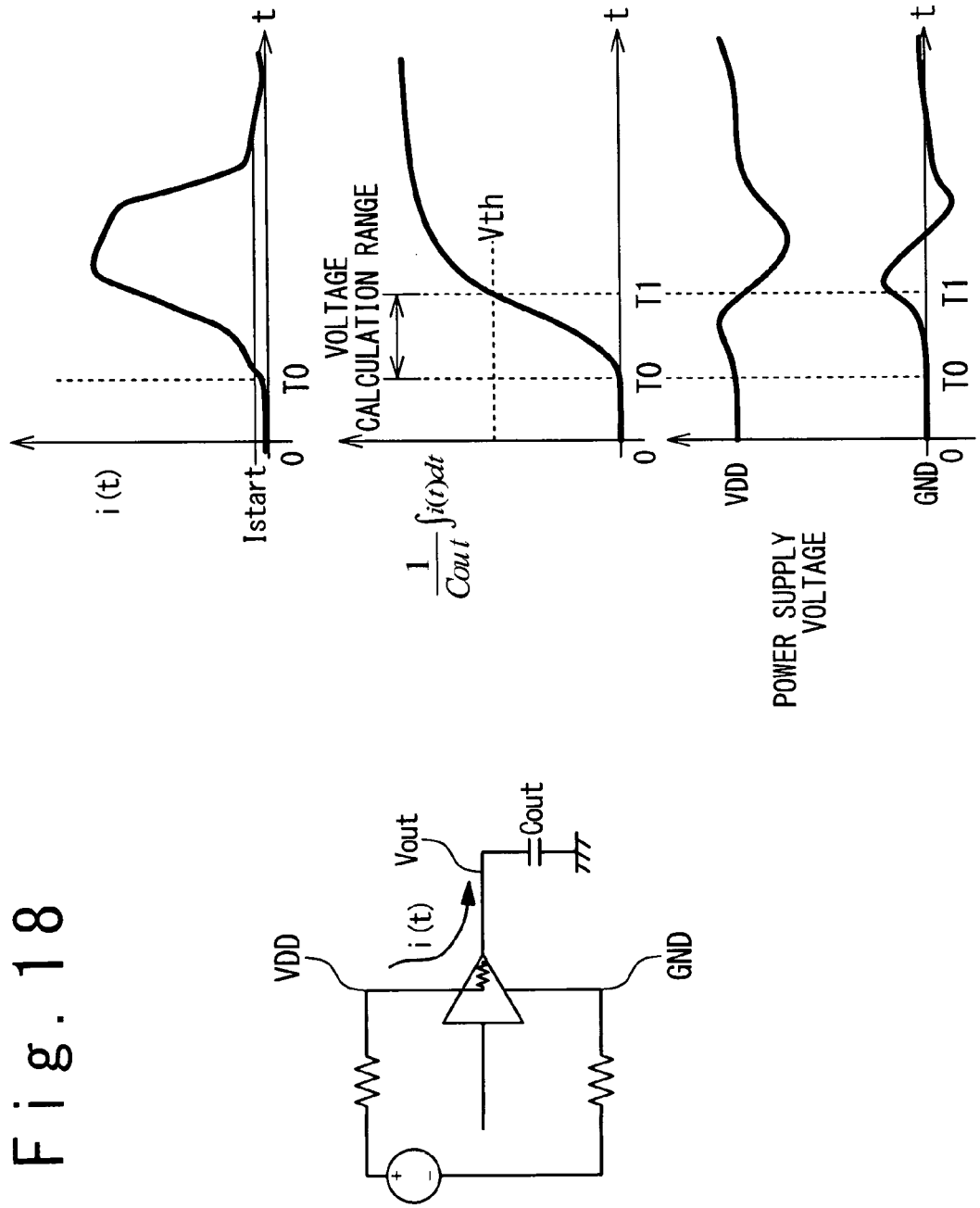
FIG. 18 is an explanatory diagram for a power supply variation analysis method in the second embodiment.
Figure 19:
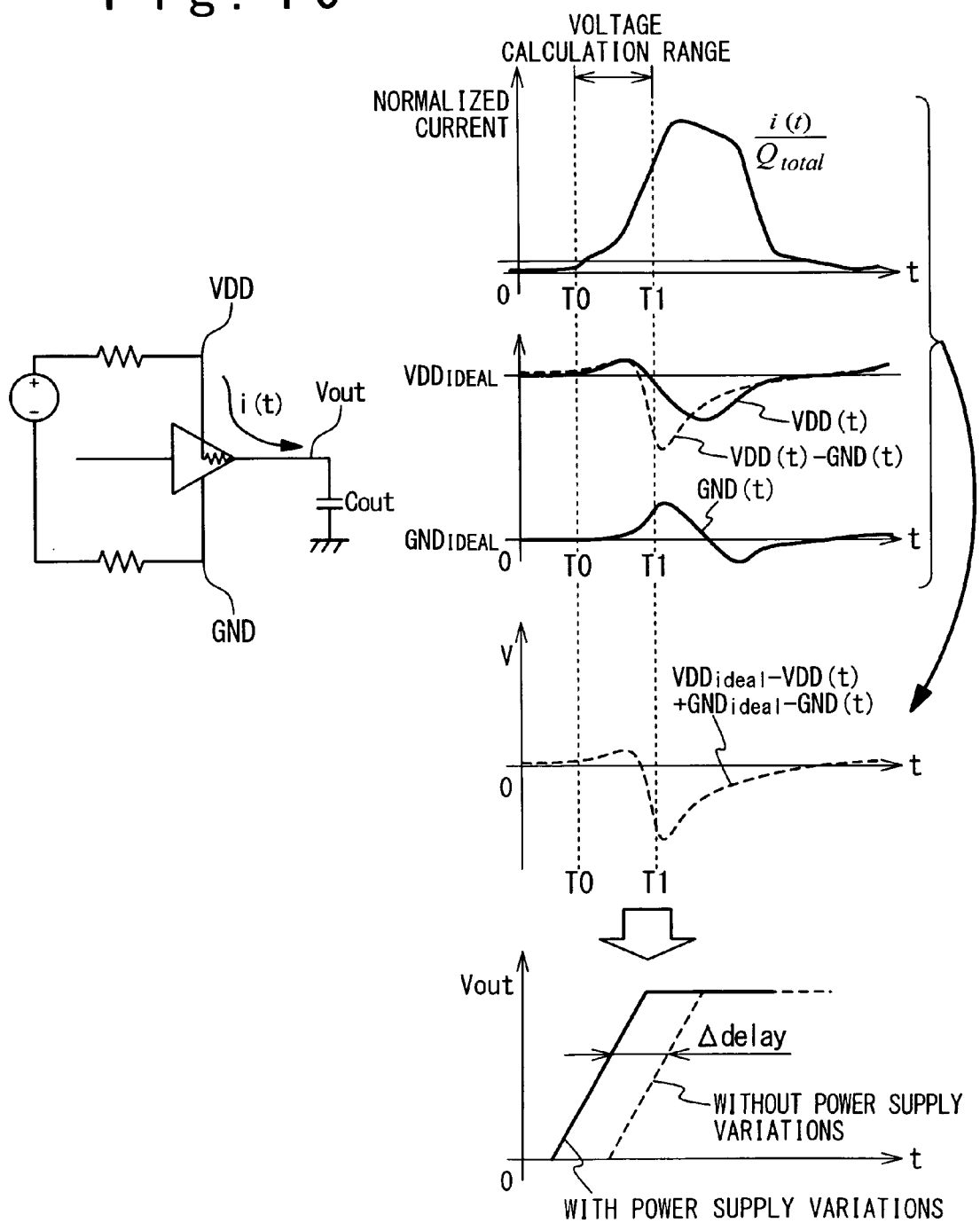
FIG. 19 is an explanatory diagram for the power supply variation analysis method in the second embodiment.

A procedure of the delay variation calculation depending on the variations of the power supply voltages and the power supply currents will be described in detail. FIGS. 18 and 19 are graphs explaining the delay variation calculation method in this embodiment.

At steps (2-1) to (2-3) described below, the delay variation calculation tool 6-11 first calculates a calculation start time and end time used in the delay variation calculation on the basis of the currents through the respective instances, Step (2-1): Acquisition of Output Load Capacitance The delay variation calculation tool 6-11 calculates the output load capacitance Cout of each instance from RLC network data 2-20 of the power supply and signal lines extracted from the layout data generated by the placement and routing tool 1-1. Alternatively, the delay variation calculation tool 1-9 may calculate the output load capacitance Cout of each instance from the current level of the current through each instance. Details of the procedure of calculating the output load capacitance Cout from the current through each instance will be described later. This step is a pre-process performed by the power supply variation analysis tool 6-2.

Step (2-2): Determination of Calculation Start Time T0

Referring to the graph of the current waveform shown in FIG. 18, the start time T0 is determined as being the time at which the sum of the power supply and ground currents (that is, Ivdd+Ignd) described in (Ivdd+Ignd) current report data 6-9 exceeds a predetermined reference current Istart.

Step (2-3): Determination of Calculation End Time T1

A process of calculating the end time T1 differs depending on how the output load capacitance Cout is specified. There are two possible methods to specify the output load capacitance Cout of each instance: (1) a first method is to obtain the output load capacity Cout from the RLC network data 2-10 of the power supply and signal lines, and (2) a second method is to obtain the load capacity Cout from the current through the instance. The end time T1 is calculated in different ways depending on the selection of the method of specifying the output load capacitance Cout as described below.

(2-3-1): Case when the Output Load Capacity Cout is Obtained from the RLC Network Data 2-10 of the Power Supply and Signal Lines In this case, the end time T1 is calculated based on the integration of the power supply current Ivdd or the ground current Ignd, in the time domain. The output voltage Vout of the instance is expressed as follows:

$$Vout = \frac{\int_{T0}^{T1} i(t)dt}{Cout},$$

where i(t)=Ivdd, or i(t)=Ignd. As shown in FIG. 18, the end time T1 is defined as the time when the output voltage Vout is increased up to a threshold voltage Vth. It should be noted that the threshold voltage Vth is a value externally specified in advance. That is, the end time T1 is calculated so that it holds:

$$Vout = \frac{\int_{T0}^{T1} i(t)dt}{Cout} = Vth, \qquad (1)$$

(2-3-2) Case when the Output Load Capacitance Cout is Obtained from the Level of the Current Through the Instance When the output load capacitance Cout of the target instance is not described in the RLC network data 2-10, the end time T1 is calculated by additionally using the following equation:

$$Vdd = \frac{\int_{T0}^{\infty} i(t)dt}{Cout}, \qquad (2)$$

where Vdd is the ideal power supply voltage for the case that the power supply voltage does not experience variations. By normalizing the equation (1) with the equation (2), the following equation (3) is obtained:

$$\frac{Vout}{Vdd} = \frac{\int_{T0}^{T1} i(t)dt}{\int_{T0}^{\infty} i(t)dt} = \frac{Vth}{Vdd}, \qquad (3)$$

The end time T1 is defined to satisfy the equation (3). The use of the equation (3) enables to calculate the end time T1 without the information on the output load capacitance Cout.

At steps (2-4) and (2-5) described below, delay variations are calculated on the basis of the power supply voltage variations and the power supply currents.

Step (2-4): Normalization of Current Through Instance

At the step (2-4), the current through the instance is normalized by using the following equation:

$$i_{norm}(t) = \frac{i(t)}{\int_{T0}^{T1} i(t)dt} = \frac{i(t)}{Q_{total}}, \qquad (4)$$

where i(t)=Ivdd or i(t)=Ignd, and $i_{norm}(t)$ is the normalized current. It should be noted that the power supply currents Ivdd of the respective instances are described in the power supply current report data 6-3 and the ground currents Ignd of the respective instances are described in the ground current report data 6-4. It should be also noted that the start time T0 and the end time T1 are obtained at the step (2-3).

(2-5) Calculation of Delay Variations

The delay variations are calculated from the above-described normalized current $i_{norm}(t)$ and the power supply voltage variations defined as ΔVDD(t)−ΔGND(t), which is described in the (VDD−GND) variation report data 6-10, where ΔVDD(t)=VDD$_{ideal}$−VDD(t), and ΔGND(t)=GND$_{ideal}$−GND(t)

Here, VDD$_{ideal}$ and GND$_{ideal}$ are the power supply and ground voltages, respectively, for the case in which the target circuit does not experience power supply variations. The power supply and ground voltages VDD(t) and GND(t) are described in the power supply voltage variation report data 6-5 and the ground voltage variation report data 6-6, respectively.

In detail, the delay variation Δdelay of a target instance is calculated as the integration of the product of the normalized current $i_{norm}(t)$ and ΔVDD(t)−ΔGND(t) with respect to the time period from the start time T0 to the end time T1, further multiplied by the delay variation factor DF described in the delay variation library 1-17. In other words, it holds:

$$\Delta delay = \int_{T0}^{T1} DF \cdot (\Delta VDD(t) - \Delta GND(t)) \cdot i_{norm}(t)dt, \qquad (5)$$

The delay variation Δdelay is calculated from the equation (5).

Third Embodiment

In the second embodiment, the delay variation is calculated under the assumption that the power supply current is free from the influence of the power supply voltage variations. However, the power supply current through an actual circuit is often varied by the influence of the power supply voltage variation and the power supply current variation is not negligible in the delay variation calculation in some case. In a third embodiment, the delay variation calculation is performed with higher accuracy in view of the power supply current variation depending on the power supply voltage variation.

Figure 20:
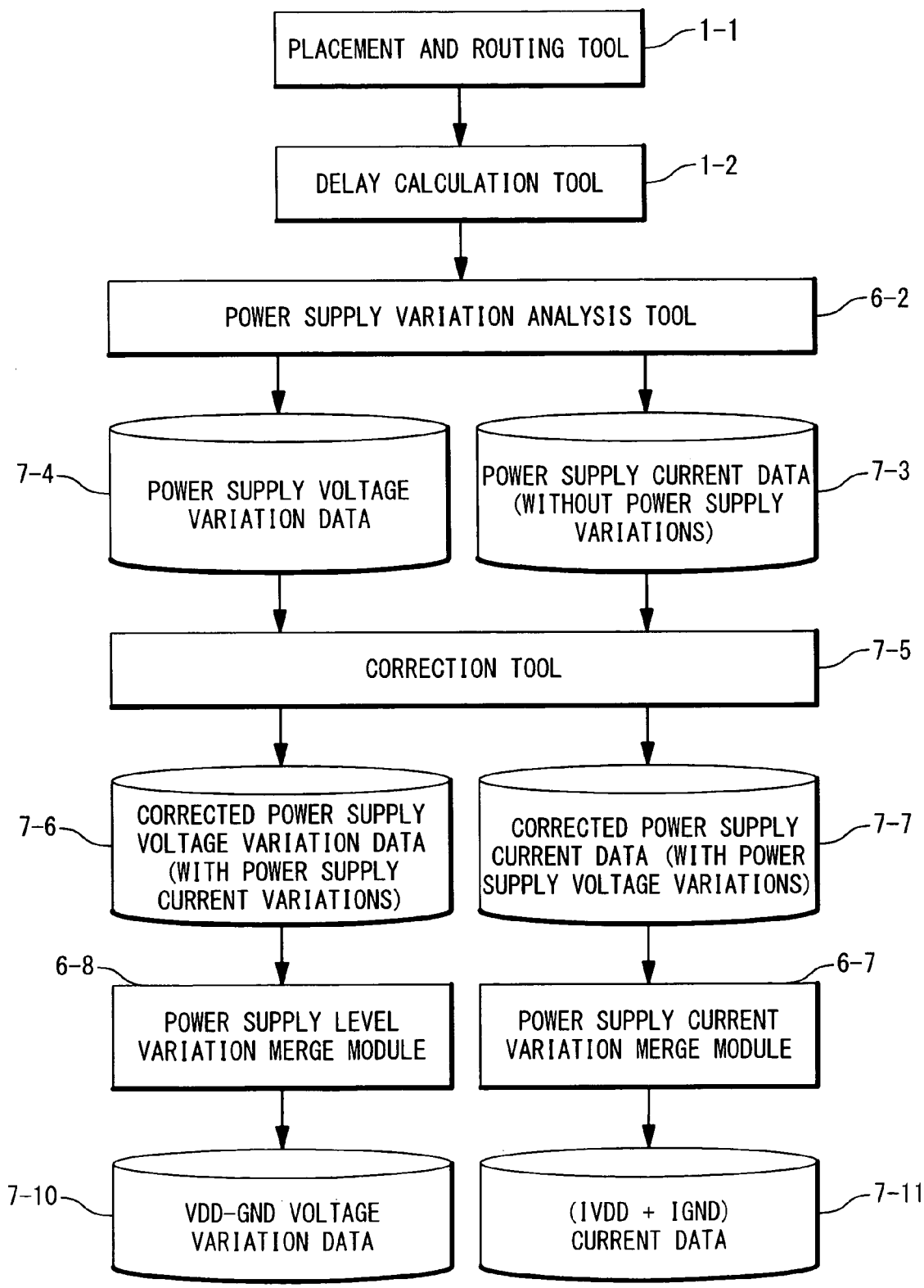
FIG. 20 is a schematic diagram showing a major part of an integrated circuit design apparatus in a third embodiment of the present invention.

FIG. 20 is a block diagram of an integrated circuit design apparatus according to the third embodiment. In FIG. 20, the same numerals denote the same elements shown in FIGS. 1, 3, and 16. In FIG. 20, components of the integrated circuit design apparatus which are identical in the configuration and operation to those shown in FIGS. 1, 3 and 16 may not be shown for simplicity, and descriptions thereof are not given in the following. Power supply current data 7-3 collectively denote the power supply current report data 6-4 the ground current report data 6-3 and, and power supply voltage data 7-4 collectively denote the power supply voltage variation report data 6-6 and the ground voltage variation report data 6-5. It should be noted that the power supply current data 7-3 describes the power supply and ground currents for the case when the target circuit does not experience the power supply variations.

The integrated circuit design apparatus of the third embodiment additionally includes a correction tool 7-5 differently from those of the first and second embodiments. The correction tool 7-5 corrects the power supply and ground currents described in the power supply current data 7-3 on the basis of the variation of the power supply and ground voltages described in the power supply voltage variation data 7-4, and thereby generates corrected power supply current data 7-7 indicative of the corrected power supply currents Ivdd$_{crct}$ and ground currents Ignd$_{crct}$ of the respective instances.

Further, the correction tool 7-5 corrects the power supply and ground voltages described in the power supply voltage variation data 7-4 on the basis of the corrected power supply current data 7-7 in view of the correction of the power supply and ground currents. The correction tool 7-5 generates corrected power supply voltage variation data 7-6 indicative of the corrected power supply voltages VDD$_{crct}$ and the corrected ground voltages GND$_{crct}$ of the respective instances. The power supply voltage variation data merge module 6-8 generates (VDD−GND) variation report data 7-10 from the corrected power supply voltage variation data 7-6, the generated (VDD−GND) variation report data 7-10 being indicative of the difference between the corrected power supply voltage VDD$_{crct}$ and the corrected ground voltage GND$_{crct}$ of each instance at each timing. Correspondingly, the power supply current data merge tool 6-7 generates (Ivdd+Ignd) current report data 7-11 from the corrected power supply current data 7-7, the generated (Ivdd+Ignd) current report data 7-11 being indicative of the sum of the corrected power supply current Ivdd$_{crct}$ and the corrected ground current Ignd$_{crct}$.

Figure 21:
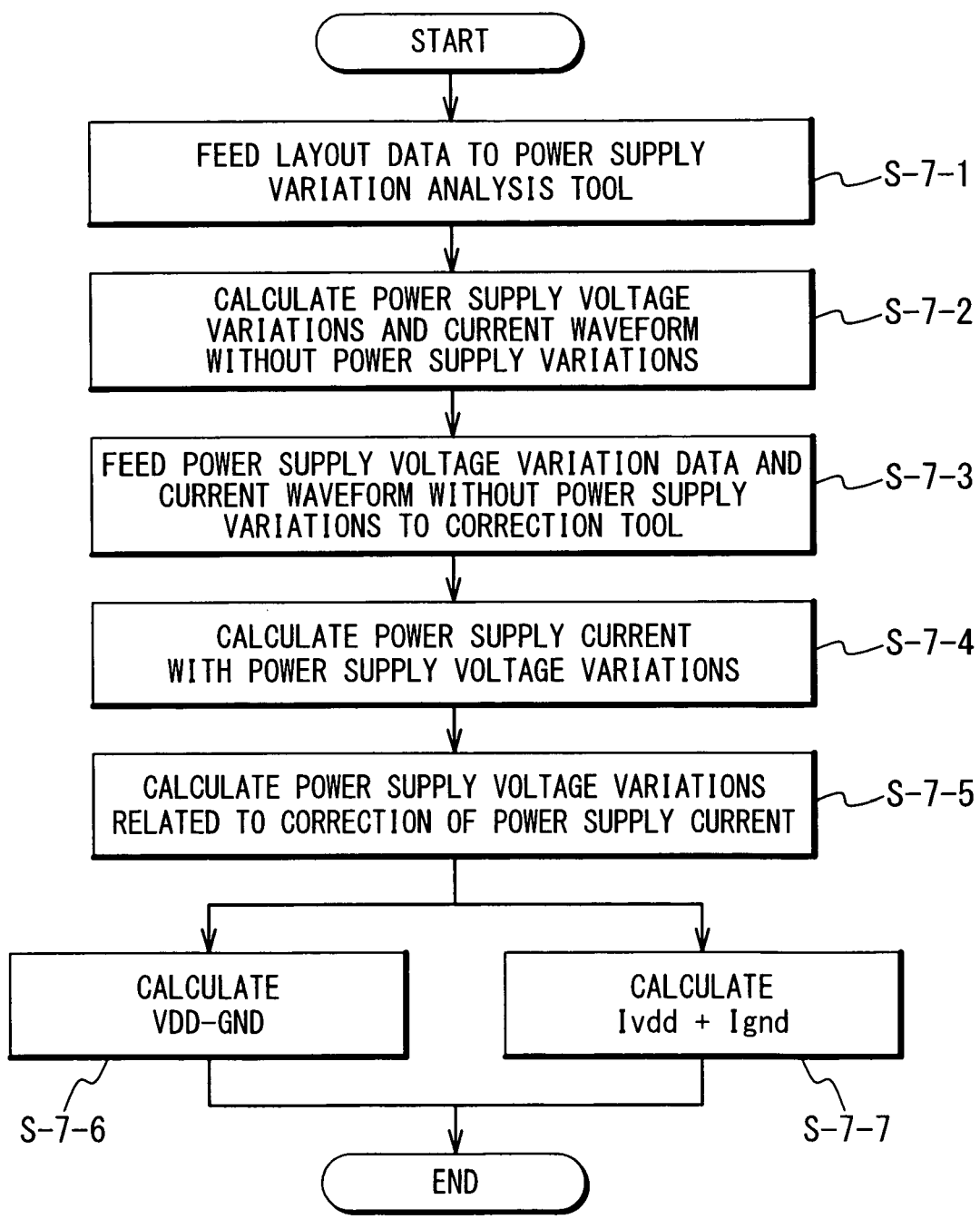
FIG. 21 is a flowchart showing an operation of the integrated circuit design apparatus in the third embodiment.

FIG. 21 is a flowchart showing the generation procedure of the (VDD−GND) variation report data 7-10 and the (Ivdd+Ignd) current report data 7-11 in the third embodiment. At the step S-7-1, the RLC network data 2-10, the instance current waveform data 2-11, the instance static capacity data 2-12, which are extracted from layout data generated by the placement and routing tool 1-1 as well as the circuit operation pattern data 2-6 are fed to the power supply voltage variation analysis tool 6-2. At the step S-7-2, the power supply voltage variation analysis tool 6-2 performs power supply variation analysis to thereby generate the power supply voltage variation data 7-4. The power supply voltage variation analysis tool 6-2 also calculates the waveforms of the power supply and ground currents to generate the power supply current data 7-3. At the step S-7-3, the power supply voltage variation analysis tool 6-2 feeds the power supply voltage variation data 7-4 and the power supply current data 7-3 to the correction tool 7-5. At the step S-7-4, the correction tool 7-5 corrects the power supply and ground currents described in the power supply current data 7-3 on the basis of the variations in the power supply voltages of the respective instances described in the power supply voltage variation data 7-4 to generate the corrected power supply current data 7-7 in view of the power supply voltage variations. At the step S-7-5, the correction tool 7-5 corrects the power supply voltage variation data 7-4 based on the corrected power supply current data 7-7 to generate the corrected power supply voltage variation data 7-6 in view of the variations in the power supply and ground currents. At the step S-7-6, the power supply voltage variation data merge module 6-8 calculates the difference between the corrected power supply voltage $VDD_{crct}$ and the corrected ground voltage $GND_{crct}$ described in the corrected power supply voltage variation data 7-6 to generate the (VDD−GND) variation report data 7-10. The (VDD−GND) variation report data 7-10 are fed to the delay variation calculation tool 6-11. At the step S-7-7, the correction tool 7-5 calculates the sum of the corrected power supply current $Ivdd_{crct}$ and the ground current $Ignd_{crct}$ described in the corrected power supply current data 7-7 to generates the (Ivdd+Ignd) current data 7-11.

A description is given next of the procedure for the correction tool 7-5 to correct the power supply current Ivdd and the ground current Ignd of each instance in view of the power supply voltage variation. The correction of the power supply and ground currents Ivdd and Ignd is based on the power supply voltage variation $\Delta V(t)$ defined as follows:

$$\Delta V(t) = \Delta VDD(t) - \Delta GND(t),$$

where $$\Delta VDD(t) = VDD_{ideal} - VDD(t), \text{ and}$$

$$\Delta GND(t) = GND_{ideal} - GND(t).$$

It should be noted that VDD(t) is the power supply voltage described in the power supply voltage variation data 7-4 and GND(t) is the ground voltage described in the power supply voltage variation data 7-4. The corrected power supply current Ivdd(t)' and corrected ground current Ignd(t)' are calculated as follows:

$$Ivdd(t)' = \alpha \cdot \frac{\Delta V(t)}{VDD_{ideal} - GND_{ideal}} \cdot Ivdd(t), \quad (6a)$$

$$Ignd(t)' = \alpha \cdot \frac{\Delta V(t)}{VDD_{ideal} - GND_{ideal}} \cdot Ignd(t), \quad (6b)$$

where α is a conversion coefficient specified externally. The current i(t) of the equations (1), (2), and (3) are substituted by the corrected power supply current Ivdd(t)' or corrected ground current Ignd(t)'.

A description is then given of the procedure for the correction tool 7-5 to further correct the power supply voltage VDD(t) and the ground voltage GND(t) in view of the correction of power supply and ground currents.

The corrected power supply voltage VDD(t)' and the corrected ground voltage GND(t)' are calculated by the equations (7a) and (7b):

$$VDD(t)' = \beta \cdot \frac{Ivdd(t)'}{Ivdd(t)} \cdot VDD(t), \quad (7a)$$

$$GND(t)' = \beta \cdot \frac{Ignd(t)'}{Ignd(t)} \cdot GND(t), \quad (7b)$$

where β is a conversion coefficient specified externally. In the delay variation calculation of this embodiment, $\Delta VDD(t)$ and $\Delta GND(t)$ in the equation (5) are calculated by using the corrected power supply voltage VDD(t)' and the corrected ground voltage GND(t)' in place of the power supply voltage VDD(t) and the ground voltage GND(t).

Fourth Embodiment

In the third embodiment, the power supply and ground currents are corrected based on the calculation result of the variations in the power supply and ground voltages, and the power supply and ground voltages are then corrected based on the correction of the power supply and ground currents.

It is preferable, however, that corrections of the power supply and ground currents and the power supply and ground voltages are repeated recursively until the corrected voltages and currents converges in predetermined ranges in order to improve the accuracy of the delay variation calculation.

In a fourth embodiment, such corrections of the voltages and currents are repeated to improve the accuracy of the delay variation calculation.

Figure 22:
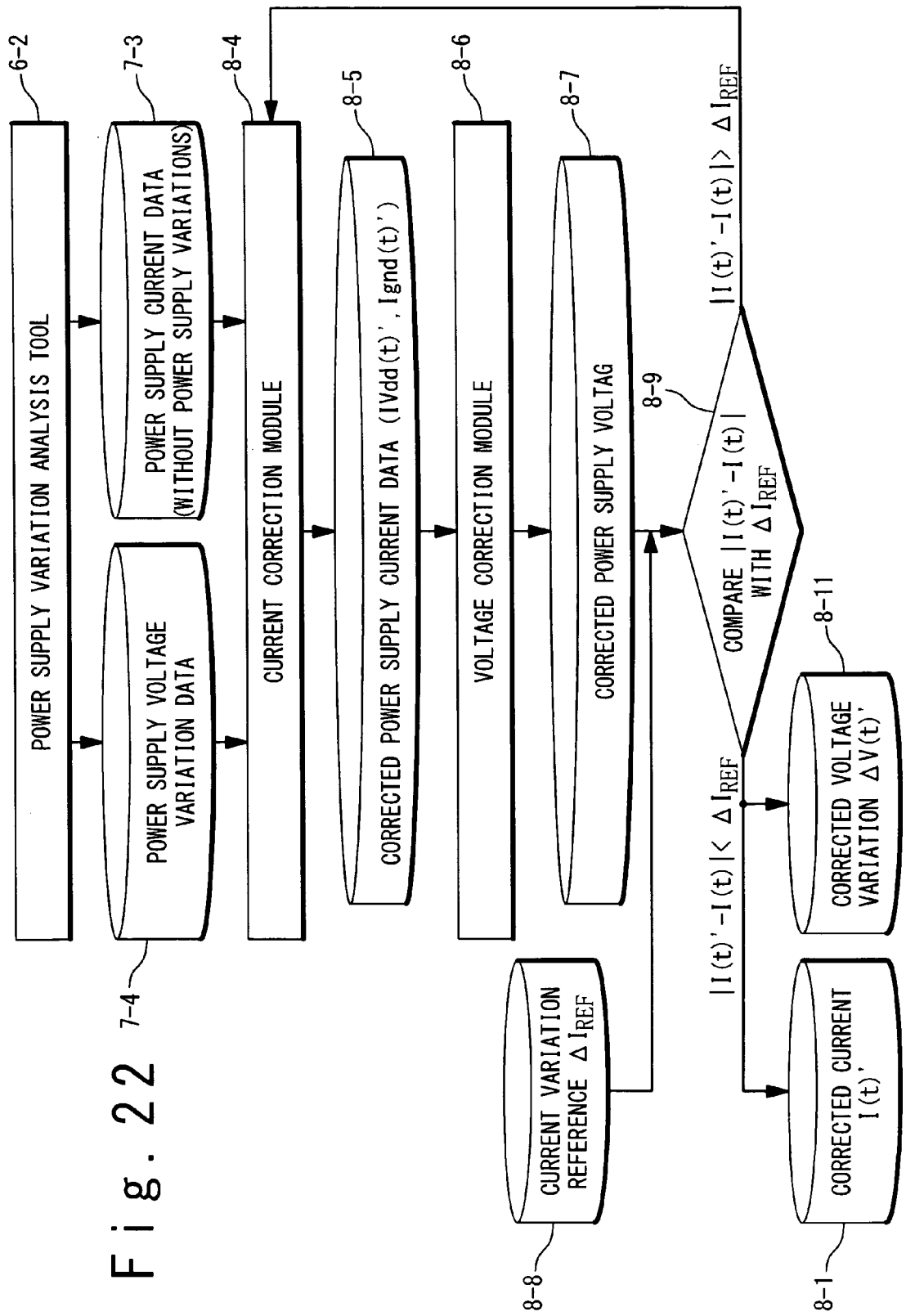
FIG. 22 is a schematic diagram showing a major part of an integrated circuit design apparatus in a fourth embodiment of the present invention.

FIG. 22 is a block diagram showing the configuration of a main portion of the integrated circuit design apparatus of the fourth embodiment. In FIG. 22, the same numerals denote the same elements shown in FIG. 16. In FIG. 22, components of the integrated circuit design apparatus which are identical in the configuration and operation to those shown in FIGS. 1, 3, 16, and 22 may be not shown for simplicity, and descriptions thereof are not given in the following.

In the fourth embodiment, as shown in FIG. 22, a current correction module 8-4 and a voltage correction module 8-6 are used in place of the correction tool 7-5 of the third embodiment. The current correction module 8-4 corrects the power supply currents Ivdd(t) and the ground currents Ignd(t) of the respective instances described in the power supply current data 7-3 based on the power supply voltage variations $\Delta V(t)$ of the respective instances in the same way as the third embodiment, and thereby generates corrected power supply current data 8-5 indicative of corrected power supply currents Ivdd(t)' and the corrected ground currents Ignd(t)' of the respective instances. The voltage correction module 8-6 corrects the power supply voltages VDD(t) and the ground voltages GND(t) of the respective instances described in the power supply voltage variation data 7-5 based on the corrected power supply currents Ivdd(t)' and the ground currents Ignd(t)' of the respective instances in the same way as the third embodiment, and thereby generates corrected power supply voltage variation data 8-7 indicative of corrected power supply voltages VDD(t)' and the ground voltages GND(t)' of the respective instances.

Additionally, the integrated circuit design apparatus of the fourth embodiment includes a current variation determination module 8-9 which make comparison of the difference of the corrected and uncorrected power supply currents with a current difference reference $\Delta I_{REF}$ and comparison of the difference of the corrected and uncorrected power supply currents with the current difference reference $\Delta I_{REF}$ for each instance. It should be noted that, in FIGS. 22 and 23, the uncorrected power supply and ground currents Ivdd(t) and Ignd(t) are collectively referred to as I(t) and the corrected power supply and ground currents Ivdd(t)' and Ignd(t)' are collectively referred to as I(t)'. The current variation determination module 8-9 is responsive of the results of the comparisons for outputting corrected power supply current data 8-1 and power supply voltage variation data 8-11 or repeating the corrections of the power supply and ground currents Ivdd(t) and Ignd(t) and the power supply and ground voltages VDD(t) and GND(t), wherein the corrected power supply current data 8-1 describe the corrected power supply and ground currents Ivdd(t)' and Ignd(t)' of the respective instances and the power supply voltage variation data 8-11 describe the power supply voltage variations ΔV(t)' of the respective instances, wherein ΔV(t)' is defined as follows:

$$\Delta V(t)'=\Delta VDD(t)'-\Delta GND(t)',$$

$$\Delta VDD(t)'=VDD_{ideal}-VDD(t)', \text{ and}$$

$$\Delta GND(t)'=GND_{ideal}-GND(t)'.$$

The delay variation Δdelay of a specific instance is calculated from the equations (4) and (5) with ΔV(t)' used in place of ΔVDD(t)−ΔGND(t) in the equation (5) and with Ivdd(t)' or Ignd(t)' used in place of i(t) in the equation (4)

Figure 23:
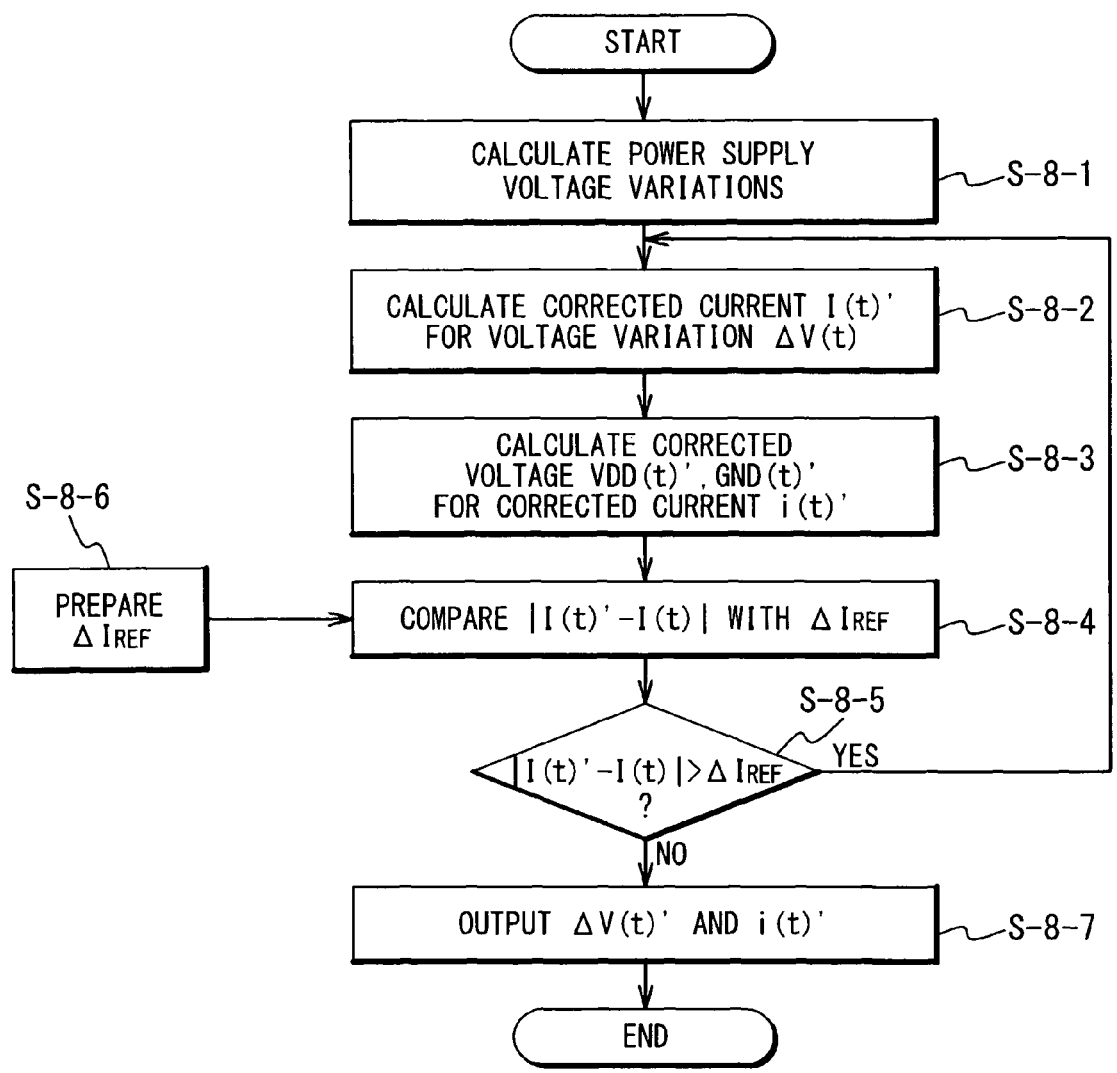
FIG. 23 is an explanatory diagram of a power supply voltage variation analysis method in the fourth embodiment.
Figure 24:
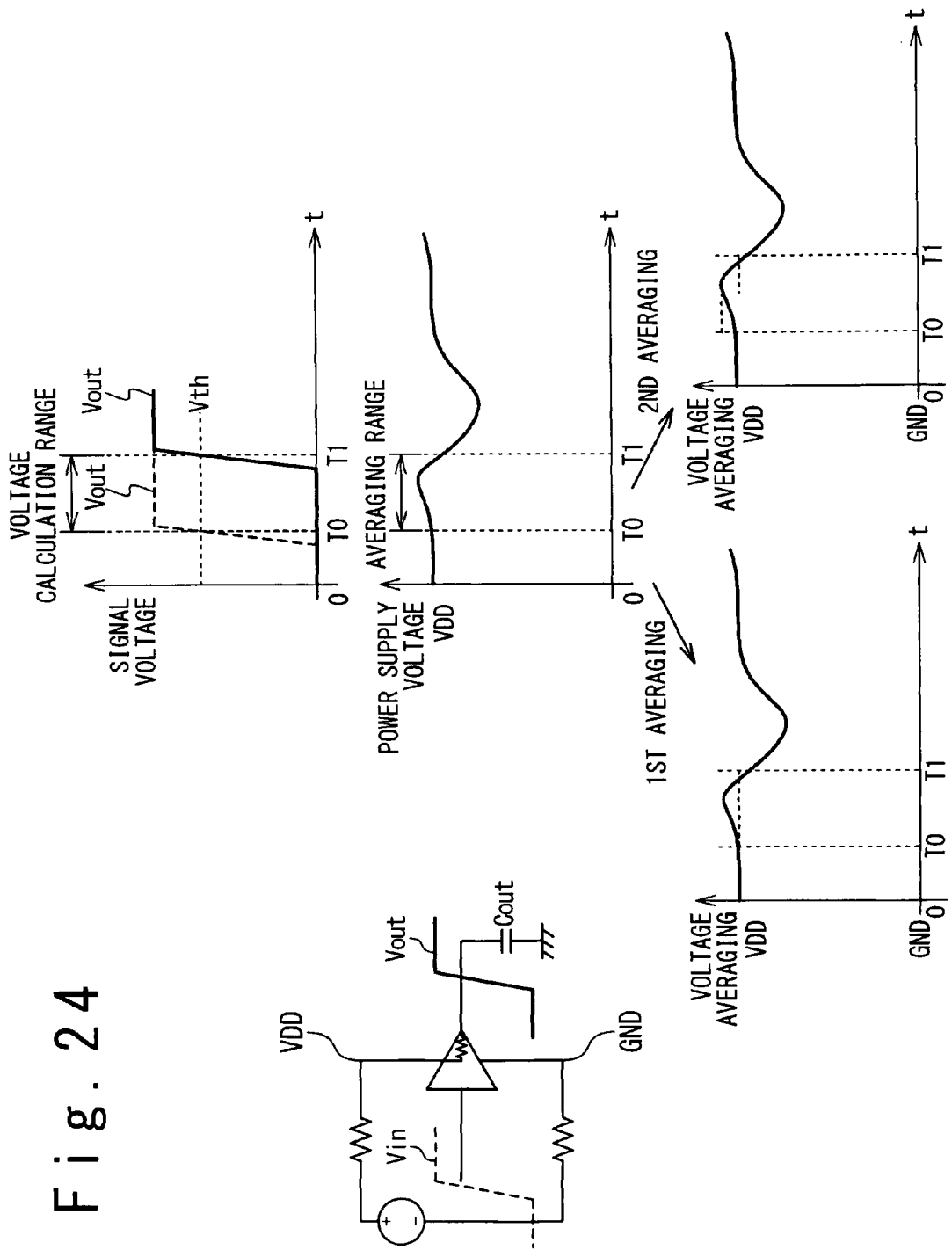
FIG. 24 is an explanatory diagram for a conventional power supply voltage variation analysis method.
Figure 25:
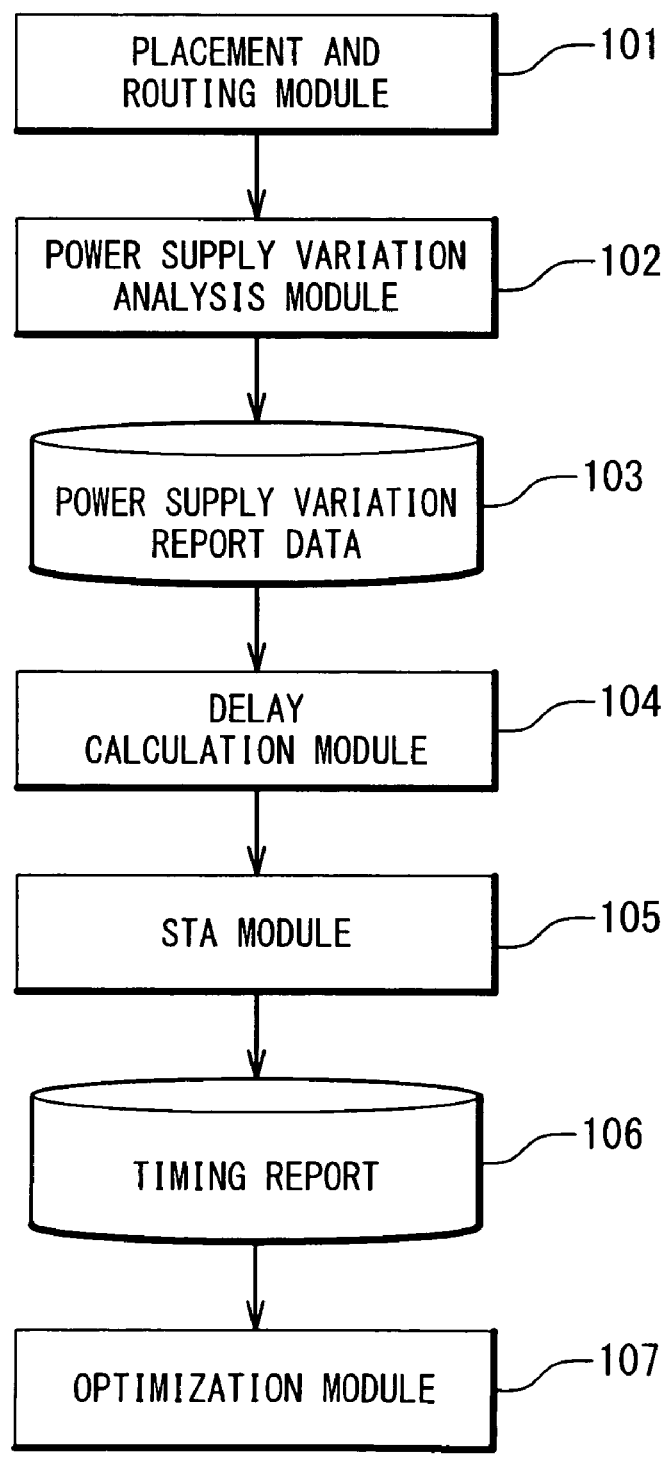
FIG. 25 is a block diagram of a conventional integrated circuit design apparatus.

FIG. 23 shows a procedure of corrections of the power supply and ground currents Ivdd(t) and Ignd(t) and the power supply and ground voltages VDD(t) and GND(t) for a specific instance.

At step S-8-6, the current difference reference $\Delta I_{REF}$ is prepared in advance in the storage unit of the integrated circuit design apparatus. At step S-8-1, similarly to the second and third embodiments, the power supply variation analysis tool 6-2 calculates the variations in the power supply and ground voltages VDD(t) and GND(t) and the power supply and ground currents Ivdd(t) and Ignd(t). At the step S-8-2, similarly to the third embodiment, the corrected power supply and ground currents Ivdd(t)' and Ignd(t)' are calculated on the basis of the variation ΔV(t) in the power supply and ground voltages VDD(t) and GND(t).

At step S-8-3, similarly to the third embodiment, the corrected power supply and ground voltages VDD(t)' and GND(t)' are calculated. At the step S-8-4, the difference between the corrected and original power supply currents Ivdd(t)' and Ivdd(t) and the difference between the corrected and original ground current Ignd(t)' and Ignd(t) are calculated, and then compared with the current difference reference $\Delta I_{REF}$ at the step S-8-5. When any of |Ivdd(t)'−Ivdd(t)| and |Ignd(t)'−Ignd(t)| exceeds the current difference reference $\Delta I_{REF}$, the procedure returns to step S-8-2, replacing Ivdd(t) with Ivdd(t)', Ignd(t) with Ignd(t)', VDD(t) with VDD(t)', and GND(t) with GND(t)'.

When both of |Ivdd(t)'−Ivdd(t)| and |Ignd(t)'−Ignd(t)| are smaller than the current difference reference $\Delta I_{REF}$, at the step S-8-7, the corrected power supply current data 8-1 and the power supply voltage variation data 8-11 are outputted to complete the power supply voltage analysis, wherein the corrected power supply current data 8-1 describe the corrected power supply and ground currents Ivdd(t)' and Ignd(t)' of the respective instances and the power supply voltage variation data 8-11 describe the power supply voltage variations ΔV(t)' of the respective instances.

In the above-described procedure, the determination at the step S-8-5 are based on the difference between the corrected and original power supply currents Ivdd(t)' and Ivdd(t), and the difference between the corrected and original ground currents Ignd(t)' and Ignd(t). Alternatively, the determination at the step S-8-5 may be based on the difference between corrected and original power supply voltage variation |ΔV(t)'−ΔV(t)| in place of or in addition to |Ivdd(t)'−Ivdd(t)| and |Ignd(t)'−Ignd(t)|. When the determination at the step S-8-5 is based on the difference between corrected and original power supply voltage variation |ΔV(t)'−ΔV(t)| in addition to |Ivdd(t)'−Ivdd(t)| and |Ignd(t)'−Ignd(t)|, the corrections at the steps S-8-2 and S-8-3 are repeated as long as any of |ΔV(t)'−ΔV(t)| |Ivdd(t)'−Ivdd(t)|, and |Ignd(t)'−Ignd(t)| exceeds the associated voltage or current difference reference, and the power supply variation analysis is completed when all of |ΔV(t)'−ΔV(t)|, |Ivdd(t)'−Ivdd(t)| and |Ignd(t)'−Ignd(t)| are reduced below the associated voltage or current difference reference.

It is apparent that the present invention is not limited to the above embodiments, but may be modified and changed without departing from the scope of the invention.

What is claimed is:

1. An integrated circuit design apparatus, comprising:
   a power supply voltage variation analysis tool, as executed by a processor on said apparatus, calculating variations of power supply voltages of respective instances integrated within a target circuit;
   a determination module, executed by the processor, comparing said variations of said power supply voltages with first and second reference levels, said second reference level being smaller than said first reference level;
   a redesign module, executed by the processor, adapted to redesign said target circuit when at least one of said variations of said power supply voltages is larger than said first reference level;
   a delay variation calculation module, executed by the processor, adapted to correct circuit delay data of said respective instances based on said variations of said power supply voltages of said respective instances; and
   a static timing analysis tool, executed by the processor, performing a timing verification of said target integrated circuit,
   wherein, in said timing verification, said corrected circuit delay data are used for a specific instance out of said instances within said target circuit, when a variation of a power supply voltage of said specific instance is in a range from said second reference level to said first reference level, and said circuit delay data uncorrected are used for said specific instance, when said variation of said power supply voltage of said specific instance is smaller than said second reference level.

2. The integrated circuit design apparatus according to claim 1, wherein said second reference level is dependent on a function of said target circuit.

3. The integrated circuit design apparatus according to claim 1, wherein a dynamic-noise dependent margin that is determined based on said variation of said power supply voltage of said specific instance is used for said timing verification of said specific instance, when said variation of said power supply voltage of said specific instance is in said range from said second reference level to said first reference level.

4. The integrated circuit design apparatus according to claim 3, wherein a constant margin that is determined independently of said variation of said power supply voltage of said specific instance is used for said timing verification of said specific instance, when said variation of said power supply voltage of said specific instance is smaller than said second reference level.

5. The integrated circuit design apparatus according to claim 1, wherein said variations of power supply voltages of said respective instances are calculated by using a circuit operation pattern which allows said respective instances to operate at least once.

6. The integrated circuit design apparatus according to claim 1, wherein said circuit operation pattern is defined based on operation rates of said respective instances per clock cycle.

7. The integrated circuit design apparatus according to claim 1, further comprising a delay variation library, as tangibly embodied on a non-transitory computer readable storage device on said apparatus, describing associations of variations in power supply voltages with delay variations for respective kinds of instances and for respective possible input-pin states of said kinds of instances,
    wherein said delay variation calculation tool are adapted to correct said circuit delay data by using said delay variation library.

8. The integrated circuit design apparatus according to claim 7, further comprising a delay variation library generator which generates said delay variation library, determining said associations of variations in power supply voltages with delay variations through circuit simulation.

9. The integrated circuit design apparatus according to claim 8, wherein said power supply voltage variation analysis tool further calculates variations in power supply currents of said respective instances based on said variations in power supply voltages of said respective instances, and
    wherein said delay variation calculation tool are adapted to correct said circuit delay data of respective instances based on said variations in said power supply currents in addition to said variations in said power supply voltages.

10. A non-transitory computer-readable storage medium which records a program that when executed controls a computer to perform a method, said method comprising:
    calculating variations of power supply voltages of respective instances integrated within a target circuit;
    comparing said variations of said power supply voltages with first and second reference levels, said second reference level being smaller than said first reference level;
    redesigning said target circuit when at least one of said variations of said power supply voltages is larger than said first reference level;
    correcting circuit delay data of each of said respective instances based on a variation of a power supply voltage of said each of said respective instances, when said variation of said power supply voltage of said each of said instances is in a range from said second reference level to said first reference level; and
    performing a timing verification of said target circuit,
    wherein, in said timing verification, said corrected circuit delay data are used for a specific instance out of said instances within said target circuit, when a variation of a power supply voltage of said specific instance is in a range from said second reference level to said first reference level, and said circuit delay data uncorrected are used for said specific instance, when said variation of said power supply voltage of said specific instance is smaller than said second reference level.

11. The non-transitory computer-readable storage medium according to claim 10, wherein said second reference level is dependent on a function of said target circuit.

12. The non-transitory computer-readable storage medium according to claim 10, wherein a dynamic-noise dependent margin is determined based on said variation of said power supply voltage of said specific instance is used for said timing verification of said specific instance, when said variation of said power supply voltage of said specific instance is in said range from said second reference level to said first reference level.

13. The non-transitory computer-readable storage medium according to claim 12, wherein a constant margin determined independently of said variation of said power supply voltage of said specific instance and is used for said timing verification of said specific instance, when said variation of said power supply voltage of said specific instance is smaller than said second reference level.

14. The non-transitory computer-readable storage medium according to claim 10, wherein said variations of power supply voltages of said respective instances are calculated by using a circuit operation pattern which allows said respective instances to operate at least once.

15. An integrated circuit design method, comprising:
    calculating, as executed by a processor on an integrated circuit design apparatus, variations of power supply voltages of respective instances integrated within a target circuit;
    comparing said variations of said power supply voltages with first and second reference levels, said second reference level being smaller than said first reference level;
    redesigning said target circuit when at least one of said variations of said power supply voltages is larger than said first reference level;
    correcting circuit delay data of each of said respective instances based on a variation of a power supply voltage of said each of said respective instances, when said variation of said power supply voltage of said each of said instances is in a range from said second reference level to said first reference level; and
    performing a timing verification of said target circuit,
    wherein, in said timing verification, said corrected circuit delay data are used for a specific instance out of said instances within said target circuit, when a variation of a power supply voltage of said specific instance is in a range from said second reference level to said first reference level, and said circuit delay data uncorrected are used for said specific instance, when said variation of said power supply voltage of said specific instance is smaller than said second reference level.

16. The integrated circuit design method according to claim 15, wherein said second reference level is dependent on a function of said target circuit.

17. The integrated circuit design method according to claim 15, wherein a dynamic-noise dependent margin is determined based on said variation of said power supply voltage of said specific instance is used for said timing verification of said specific instance, when said variation of said power supply voltage of said specific instance is in said range from said second reference level to said first reference level.

18. The integrated circuit design method according to claim 17, wherein a constant margin determined independently of said variation of said power supply voltage of said specific instance and is used for said timing verification of said specific instance, when said variation of said power supply voltage of said specific instance is smaller than said second reference level.

19. The integrated circuit design method according to claim 15, wherein said variations of power supply voltages of said respective instances are calculated by using a circuit operation pattern which allows said respective instances to operate at least once.

\* \* \* \* \*